(12) United States Patent
Watanabe et al.

(10) Patent No.: US 8,423,562 B2
(45) Date of Patent: Apr. 16, 2013

(54) NON-TRANSITORY, COMPUTER READABLE STORAGE MEDIUM, SEARCH METHOD, AND SEARCH APPARATUS

(75) Inventors: Takashi Watanabe, Kawasaki (JP); Yoshihiro Tsuchiya, Yokohama (JP); Yasuo Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/461,176

(22) Filed: May 1, 2012

(65) Prior Publication Data

US 2012/0310960 A1    Dec. 6, 2012

(30) Foreign Application Priority Data

Jun. 6, 2011    (JP) ................... 2011-126764

(51) Int. Cl.
*G06F 7/00*    (2006.01)
(52) U.S. Cl.
USPC .......................... 707/756; 707/802
(58) Field of Classification Search .......... 707/756, 707/802
See application file for complete search history.

(56) References Cited

U.S. PATENT DOCUMENTS

| | | | |
|---|---|---|---|
| 7,933,208 B2* | 4/2011 | Bronnimann et al. ........ | 370/241 |
| 2002/0143755 A1 | 10/2002 | Wynblatt et al. | |
| 2005/0174272 A1 | 8/2005 | Cadambi et al. | |
| 2008/0154852 A1* | 6/2008 | Beyer et al. ................ | 707/3 |
| 2010/0199065 A1 | 8/2010 | Kaneda | |
| 2010/0332765 A1* | 12/2010 | Cypher ..................... | 711/141 |
| 2011/0270852 A1* | 11/2011 | Watanabe et al. ........... | 707/754 |

FOREIGN PATENT DOCUMENTS

| | | |
|---|---|---|
| JP | 2-297670 | 12/1990 |
| JP | 4-18895 | 1/1992 |
| JP | 2001-101047 | 4/2001 |
| JP | 2006-503342 | 1/2006 |
| JP | 2007-52698 | 3/2007 |
| JP | 2007-524946 | 8/2007 |
| JP | 2010-182302 | 8/2010 |

* cited by examiner

*Primary Examiner* — Jensen Hu
(74) *Attorney, Agent, or Firm* — Staas & Halsey LLP

(57) ABSTRACT

A non-transitory, computer readable storage medium storing a program for a computer being capable of accessing a group of nodes having divided-data structures obtained by dividing a data structure having a transposed hierarchical bloom filter of a hierarchical bloom filter and sets of data blocks by a predetermined bit width, wherein the hierarchical bloom filter has h-stage bloom filter arrays each having a bit width of "s", the hth-stage bloom filter array having bits indicating false positives or negatives and the pth-stage bloom filter array having $n = d^{[h-(p-1)]}$ bloom filters (where $1 \leq p \leq h$) each having a bit width of $m = s/d^{[h-(p-1)]}$ (where d indicates a division number for the hth-stage bloom filter array), the transposed hierarchical bloom filter is obtained in the bloom filters in the bloom filter array, and the set of data blocks corresponds to the first-stage bloom filter array of the hierarchical bloom filter.

8 Claims, 19 Drawing Sheets

FIG. 8A

| HEADER | | PAYLOAD | | | |
|---|---|---|---|---|---|
| SOURCE | DESTINATION | TYPE | ATTRIBUTE | H1 () | REGISTRATION DATA |
| M | N2 | REGISTRATION | DATA ENTRY | x1 | Dx |

| HEADER | | PAYLOAD |
|---|---|---|
| SOURCE | DESTINATION | BLOCK NO. |
| N2 | M | 4 |

| HEADER | | PAYLOAD | | |
|---|---|---|---|---|
| SOURCE | DESTINATION | TYPE | ATTRIBUTE | tbf (p) |
| C1 | N1 | SEARCH | AND OPERATION REQUEST | tbf (3-2), tbf (3-5) |

| HEADER | | PAYLOAD |
|---|---|---|
| SOURCE | DESTINATION | SEARCH RESULT |
| N1 | C1 | r3-1 = {1 0} |

| HEADER | | PAYLOAD | | |
|---|---|---|---|---|
| SOURCE | DESTINATION | TYPE | ATTRIBUTE | H1 () |
| C1 | N2 | SEARCH | HASH TABLE SEARCH | x1 |

| HEADER | | PAYLOAD |
|---|---|---|
| SOURCE | DESTINATION | SEARCH RESULT |
| N2 | C1 | Dx |

| HEADER | | PAYLOAD | | |
|---|---|---|---|---|
| SOURCE | DESTINATION | TYPE | ATTRIBUTE | H1 () |
| C1 | N4 | SEARCH | HASH TABLE SEARCH | x1 |

| HEADER | | PAYLOAD |
|---|---|---|
| SOURCE | DESTINATION | SEARCH RESULT |
| N4 | C1 | N/A |

NON-TRANSITORY, COMPUTER READABLE STORAGE MEDIUM, SEARCH METHOD, AND SEARCH APPARATUS

CROSS-REFERENCE TO RELATED APPLICATION

This application is based upon and claims the benefit of priority of the prior Japanese Patent Application No. 2011-126764, filed on Jun. 6, 2011, the entire contents of which are incorporated herein by reference.

FIELD

The embodiment discussed herein is related to a search program, a search method, a search apparatus, a node, and a search system for searching for data.

BACKGROUND

Hitherto, when a large amount of data is managed in a tree structure, the data is in relatively many cases managed with a data structure called a B-tree. The B-tree stores multiple data entries in one block. Thus, compared to a simple binary tree, the B-tree has an advantage of being able to reduce the range affected by changes in the shape of the tree structure even when a data entry is added. For this reason, B-trees are often employed as a data management method for disk media, such as hard disks.

However, when data managed with a tree structure is searched on a disk medium, multiple data blocks are actually read out. Typically, since I/O (input/output) for the disk is relatively slow compared to memory access, data searching on the disk may involve large amounts of time and work.

For this reason, recently, measures, such as providing a tree structure in the memory, may also be taken in order to avoid a search delay due to the disk I/O. Accordingly, with the B-tree, as the number of data entries increases, the amount of memory used may also increase correspondingly. Thus, a method for storing (caching) only segments that are most frequently read out in the tree structure may also be employed.

Recently, a data structure called a Bloom filter has also become available. The Bloom filter is a method for efficiently determining whether or not a certain entry belongs to an existing set. For example, there is a disclosed technology for dial-pulse processing of an electronic branch exchange. In the technology, two bits, namely, a pulse speed bit and an even-numbered/odd-numbered bit are provided for dial pulses and group processing for capturing the bits is performed.

Further, there is a disclosed technology in which pieces of index information of data are grouped into hierarchical information and the hierarchical information is arranged in a distributed manner. There is also a disclosed database search system in which attributes of data and entry information are distributed, the data is divided, indices are created for the respective pieces of data, the attributes and the entry information are stored in multiple processing apparatuses and storage devices in a distributed manner, and nodes search for the data in parallel. There is also a disclosed storage system in which, in order to check whether or not the same data is already stored, a hash value to be used as an identifier is determined from data, and when the same identifier is not found, it is regarded that the same data does not exist and thus the data is stored.

Further, there is a disclosed network database having multiple nodes. Each node determines bit vectors of a Bloom filter on the basis of a search query, generates at least one network message including a set of specific values, and transmits the network message to data sources. There is also a disclosed information retrieval technology in which hash values are determined for a stored lookup set, a third table (e.g., a Bloom filter) having the hash values at the bit positions is created, hash values are determined from an input value. Further, if an encoded input value exists in a table, it is determined that the input value is in the lookup set.

Since the B-tree can handle a large amount of data, as described above, the number of disk inputs/outputs can be reduced if appropriate caching is realized. However, it is difficult to reduce the number of disk inputs/outputs to a certain number or more. When the tree structure changes as a result of addition of a data entry, inputs/outputs for managing the tree structure may have to be provided. The Bloom filter is not directly applicable to data management, since it is adapted to check the presence of data entries. The Bloom filter also occupies a memory having a size that is proportional to a manageable amount of data.

Examples of the related art include Japanese Laid-open Patent Publication No. 2007-52698, Japanese Laid-open Patent Publication No. 04-18895, Japanese Laid-open Patent Publication No. 2001-101047, Japanese Laid-open Patent Publication No. 02-297670, Japanese Laid-open Patent Publication No. 2010-182302, Japanese National Publication of International Patent Application No. 2006-503342, and Japanese National Publication of International Patent Application No. 2007-524946.

SUMMARY

According to an aspect of the invention, a non-transitory, computer readable storage medium storing a search program for a computer that is capable of accessing a group of nodes having divided-data structures obtained by dividing a data structure having a transposed hierarchical bloom filter of a hierarchical bloom filter and a set of data blocks by a predetermined bit width, wherein the hierarchical bloom filter has h-stage bloom filter arrays each having a bit width of "s", the hth-stage bloom filter array having bits indicating false positives or negatives and the pth-stage bloom filter array having $n=d^{[h-(p-1)]}$ bloom filters (where $1 \leq p \leq h$) each having a bit width of $m=s/d^{[h-(p-1)]}$ (where d indicates a division number for the hth-stage bloom filter array), the transposed hierarchical bloom filter is obtained by grouping bits at the same positions in the bloom filters in the bloom filter array for each stage, and the set of data blocks corresponds to the first-stage bloom filter array of the hierarchical bloom filter, the search program causing the computer to execute a processing, the processing has converting search-target data into pieces of position information indicating in-array positions of the transposed bloom filters, based on respective types of hash functions, identifying, in the pth-stage transposed bloom filter array, the pth-stage transposed bloom filters corresponding to the respective pieces of position information, obtaining the identified pth-stage transposed bloom filters from the nodes having the identified pth-stage transposed bloom filters, determining whether or not the bit positions of the bits indicating false positives are the same in the obtained pth-stage transposed bloom filters, determining whether or not the pth stage is the first stage, when it is determined that the bit positions of the bits indicating the false positives are the same, and obtaining, when it is determined that the pth stage is the first stage, a search result from at least one of the nodes having the data blocks corresponding to the bit positions of the bits indicating the false positives, the search result indicating whether or not the search-target data exists in the data block corresponding to the bit positions of the bits indicating the false positives.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 8A and 8B illustrate examples of the data structures of a data-entry request and a reply, respectively.

FIGS. 16A and 16B illustrates examples of the data structures of an AND operation request and a reply.

FIGS. 18A and 18B illustrate first examples of the data structures of a hash-table search request and a reply, respectively.

FIGS. 19A and 19B illustrate second examples of the data structures of a hash-table search request and a reply, respectively.

DESCRIPTION OF EMBODIMENT

A search program, a search method, a search apparatus, a node, and a search system according to an embodiment of the present technology will be described below in detail with reference to the accompanying drawings.

Figure 1:
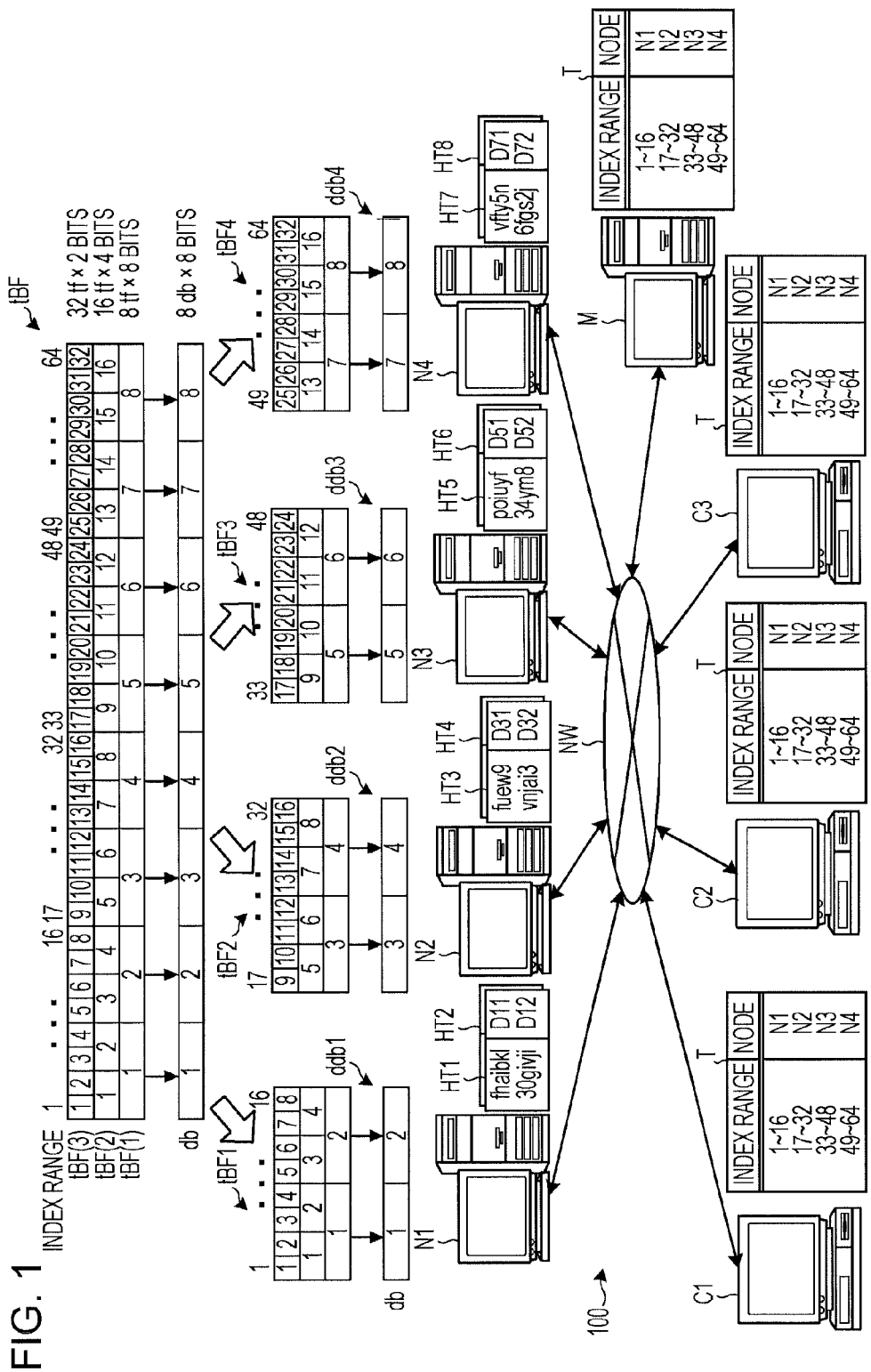
FIG. 1 illustrates an exemplary configuration of a search system according to an embodiment.

FIG. 1 illustrates an exemplary configuration of a search system according to an embodiment. As illustrated in FIG. 1, a search system 100 includes multiple nodes N1 to N4 (four nodes in the example in FIG. 1), a management server M, and one or more clients C1 to C3 (three clients in the example in FIG. 1), which are connected with each other through a network NW so as to allow communication. Examples of the network NW include a LAN (local area network), a WAN (wide area network), and the Internet.

In the present embodiment, a hierarchical transposed Bloom filter tBF is divided by the number of nodes, and the resulting hierarchical transposed Bloom filters are allocated to the nodes N1 to N4. The hierarchical transposed Bloom filter tBF is index information obtained by transposing a hierarchical Bloom filter.

The term "hierarchal Bloom filter" refers to index information of hierarchically structured Bloom filters. Each Bloom filter is index information indicating an array of bits that are included in a predetermined number of data blocks and are indicative of false positives or negatives. When a bit in the Bloom filter is ON, this indicates a false positive, and when a bit in the Bloom filter is OFF, this indicates a negative. A bit value of 1 may indicate ON and a bit value of 0 may indicate OFF. Conversely, a bit value of 0 may indicate ON and a bit value of 1 may indicate OFF. In the present embodiment, it is assumed that a bit value of 1 indicates ON (false positive) and a bit value of 0 indicates OFF (negative).

The hierarchical Bloom filter is described below with reference to FIG. 2. A relationship between the hierarchical Bloom filter and the hierarchical transposed Bloom filter tBF is also described below with reference to FIG. 3.

In the example in FIG. 1, the number of stages in the hierarchical transposed Bloom filter tBF is assumed to be 3. That is, the hierarchical transposed Bloom filter tBF has a hierarchical structure constituted by a first-stage (a lowest stage) transposed Bloom filter array tBF(1), a second-stage transposed Bloom filter array tBF(2), and a third-stage (a highest stage) transposed Bloom filter array tBF(3).

In the example in FIG. 1, the hierarchical transposed Bloom filter tBF is assumed to have a bit width "s" of 64 bits. In the example in FIG. 1, it is also assumed that the hierarchical transposed Bloom filter tBF is divided into four 16-bit-wide hierarchical transposed Bloom filters tBF1 to tBF4 for the four nodes N1 to N4. For example, the divided hierarchical transposed Bloom filter tBF1 is allocated to the node N1 and has the index range of the first to 16th bits of the hierarchical transposed Bloom filter tBF. With respect to the nodes N2 to N4, index ranges as illustrated in FIG. 1 are similarly determined and allocated.

A data block set db is also associated with the hierarchical transposed Bloom filter tBF. The data block set db is assumed to have the same bit width as the bit width "s" of the hierarchical transposed Bloom filter tBF. Thus, the data block set db is divided according to the same index range as the hierarchical transposed Bloom filter tBF. For example, a divided data block set ddb1 is allocated to the node N1 in conjunction with the divided hierarchical transposed Bloom filter tBF1. Divided data block sets ddb2 to ddb4 are similarly allocated as illustrated in FIG. 1.

The nodes N1 to N4 have corresponding hash tables HT1 to HT8. Each of the hash tables HT1 to HT8 is a table in which data and hash values obtained when the data are run through a hash function (e.g., SHA-1) common to the nodes N1 to N4 are associated with each other. The hash tables HT1 to HT8 are prepared for the data blocks db1 to db8. For example, the hash table HT1 corresponds to the data block db1.

Data specified by pointers in the hash tables HT1 to HT8 are stored in the data blocks db1 to db8 corresponding to the hash tables HT1 to HT8. For example, data D11 and D12 specified by pointers in the hash table HT1 are stored in the data block db1.

In the example in FIG. 1, numbers # illustrated in the divided data block sets ddb1 to ddb4 represent the numbers # of the data blocks. For example, "1" in the divided data block set ddb1 indicates the data block db1 and "2" in the divided data block set ddb1 indicates the data block db2.

Since the hierarchical transposed Bloom filter tBF and the data block set db are distributed to the multiple nodes N1 to N4, as described above, the scalability of a deduplication storage can be enhanced. In addition, since the hierarchical transposed Bloom filter tBF is distributed, the search speed can also be increased.

The management server M may be a computer for managing the nodes N1 to N4. The management server M has an association table T. The association table T is a table in which the index ranges of the hierarchical transposed Bloom filters and the nodes that are in charge of the index ranges are associated with each other. The management server M refers to the association table T to execute data entry processing or filter entry processing on any of the nodes N1 to N4 or to execute processing for searching for data in the nodes N1 to N4. The management server M may be a physical machine or may be implemented by a virtual machine that runs in any of the nodes N1 to N4.

The clients C1 to C3 may be computers that make use of the nodes N1 to N4. When the clients C1 to C3 do not have the association tables T, they execute data entry processing, filter entry processing, and/or data search processing through the management server M. When the clients C1 to C3 have the association tables T, they execute data entry processing, filter entry processing, and/or data search processing without use of the management server M. When the clients C1 to C3 have the association tables T, the management server M may be omitted.

Even when the clients C1 to C3 have the association tables T, the processing which the management server M and the clients C1 to C3 are in charge of may be divided. For example, the management server M may execute the data entry processing and filter entry processing and the clients C1 to C3 may execute the data search processing. A computer that executes the data entry processing and the filter entry processing is assumed to store the number of transposed Bloom filters in the hierarchical transposed Bloom filter array tBF(p) at each stage and the bit width "s" thereof, the hierarchical transposed Bloom filter array tBF(p) being used for the filter entry processing.

When data to be searched for (hereinafter referred to as "search-target data") is given in the search system 100, the divided hierarchical transposed Bloom filters tBF1 to tBF4 are referred to identify the data block db# in which the search-target data is likely to exist. When the data block db# in which the search-target data is likely to exist is not identified, the search-target data does not exist in any of the data blocks db# (i.e., negative). Conversely, even when the data block db# in which the search-target data is likely to exist is identified, the search-target data may or may not exist in the identified data block db# (i.e., false positive).

Whether the false positive turns out to be positive or negative depends on a result of search in the hash table HT# corresponding to the finally identified data block db#. For example, when a hash value of the search-target data is found in the hash table HT# corresponding to the finally identified data block db#, the false positive turns out to be positive, and when a hash value of the search-target data is not found, the false positive turns out to be negative.

Next, a description will be given of a hierarchical Bloom filter from which the hierarchical transposed Bloom filter tBF illustrated in FIG. 1 is transposed.

Figure 2:
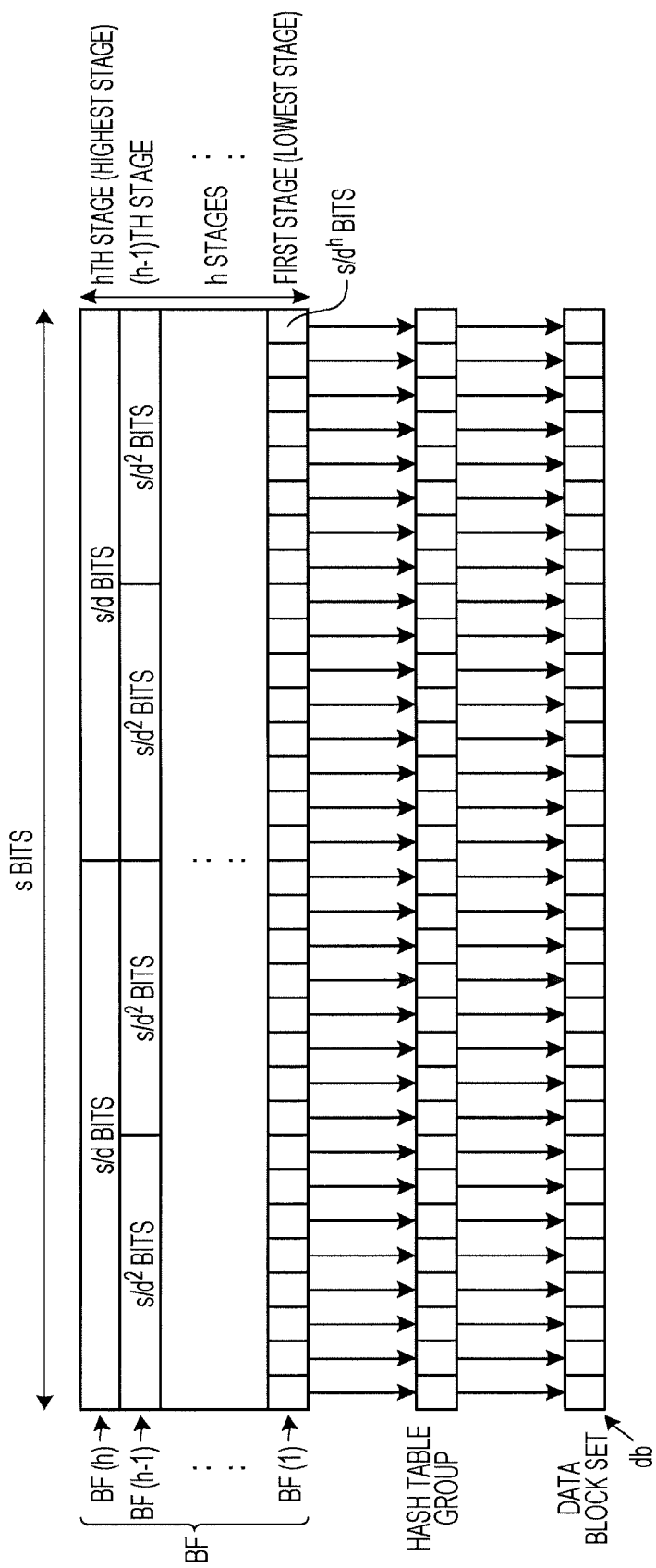
FIG. 2 illustrates one example of a hierarchical Bloom filter.

FIG. 2 illustrates one example of a hierarchical Bloom filter. This hierarchical Bloom filter BF is implemented by a memory area with "h" stages×bit width "s". The bit width "s" corresponds to the bit width of the data block set db. The bit width "s" at each stage is divided based on the division number "d" at the hth stage, which is the highest stage. The elements resulting from the division are Bloom filters, which constitute a Bloom filter array at each stage. The division number "d" is basically an integer of 2 or greater. However, when the hth stage (which is the highest stage) is constituted by a single Bloom filter, the division number "d" may be 1.

When an arbitrary stage number p is given, the bit width "m" of the Bloom filters bf(p) constituting the p-stage Bloom filter array BF(p) is expressed as $m=s/d^{[h-(p-1)]}$. In the example in FIG. 2, d is 2. The number "n" of Bloom filters bf(p) in the pth-stage Bloom filter array BF(p) is expressed as $n=d^{[h-(p-1)]}$.

Thus, in the hierarchal Bloom filter BF, as the stage goes down (h becomes small), the number of Bloom filters bf(p) in the pth-stage Bloom filter array BF(p) increases. The number of Bloom filters bf(1) in the Bloom filter array BF(1) at the lowest stage (the first stage) is the same as the number of data blocks db#.

With this arrangement, the Bloom filters bf(1) found when the first stage is reached and the data blocks db# correspond to each other on a one-to-one basis. Although the number "h" of stages in the hierarchal Bloom filter BF is basically two or more, the number of stages may be 1 (h=1). In this case, however, d is not equal to 1.

An influence of false positives of a Bloom filter will now be described. Because of characteristics of the Bloom filter, a false-positive rate FPR of the Bloom filter when it is constituted by m-bit-wide Bloom filters at h stages can be given as equation (1).

$$FPR=\{1-(1-1/m)^{kN}\}^k \approx \{1-e^{(-kN/m)}\}^k \quad (1)$$

where N denotes the number of registered pieces of data (N<m) and k denotes the number of hash functions.

In this case, changing k, m, and N makes it possible to considerably reduce the false-positive rate FPR. That is, depending upon the settings of k, m, and N, the false-positive rate FPR can be set to a significantly smaller value than 1, i.e., can be set to almost 0.

When the number "Ndb" of data blocks is assumed to be $d^h$, the number "h" of stages in height can be given as equation (2).

$$h=\log(Ndb)/\log(d)+1 \quad (2)$$

Equation (2) is based on the premise that log(Ndb)/log(d) is dividable. Otherwise, h can be determined by varying the value of d for one stage relative to the value of d for another stage.

In the search processing, comparison is performed a number of times corresponding to the number of hash values (i.e., k times (which is a constant)) and the largest number of elements to be filtered per stage during the search is d at most. Accordingly, the number "MA" of memory accesses during the search is at most on the order of the value give by equation (3).

$$MA=k \times d \times \log(Ndb)/\log(d) \quad (3)$$

That is, the number "h" of stages (=the amount of memory) can be reduced by increasing the division number "d", whereas the number of searches increases as the division number "d" increases. Thus, taking this tradeoff relationship into account allows appropriate operation of the memory.

The hierarchical transposed Bloom filter tBF will be described next. Transposing the hierarchical Bloom filter BF illustrated in FIG. 2 makes it possible to further increase the search speed, compared to the un-transposed hierarchical Bloom filter BF.

Figure 3:
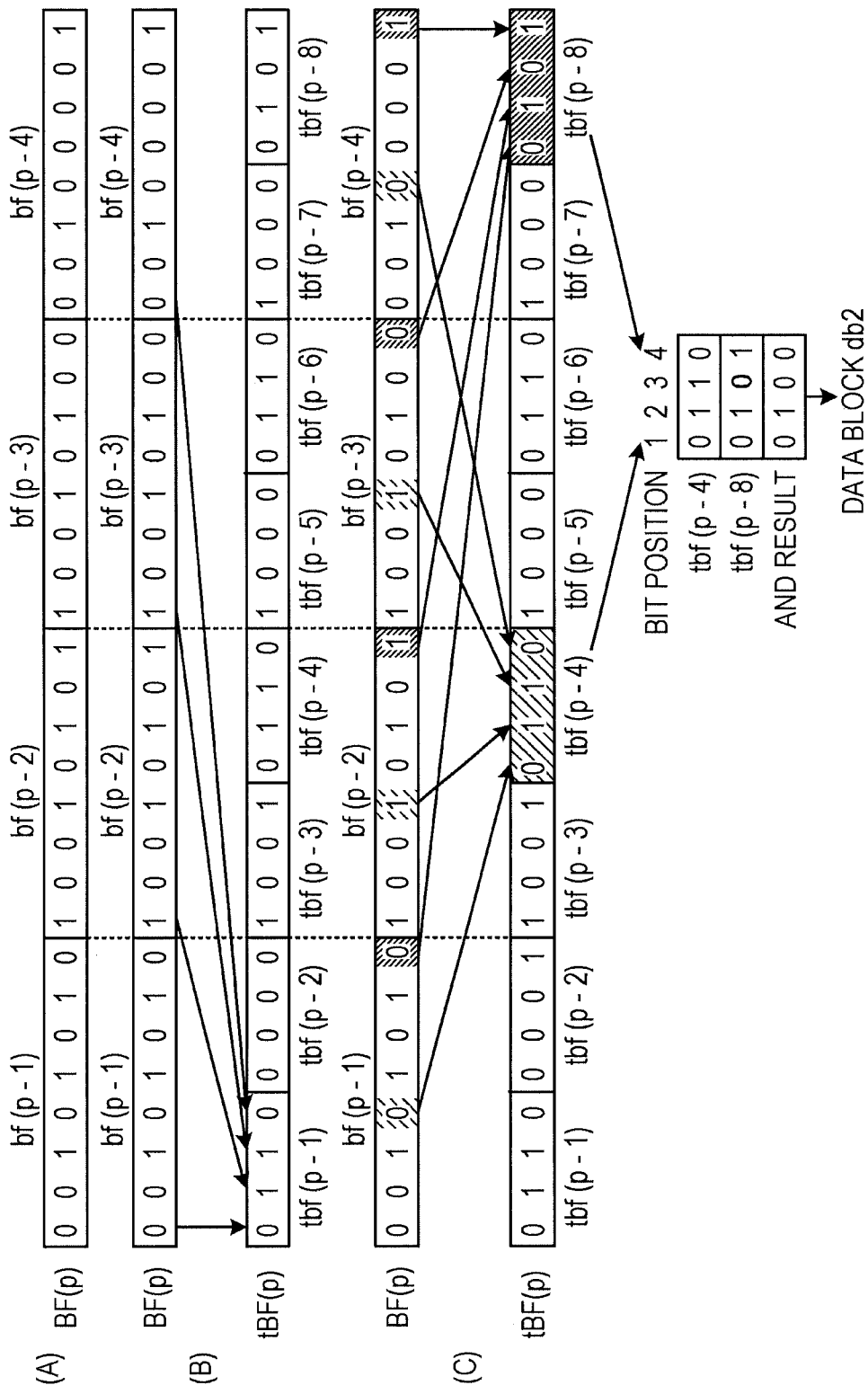
FIG. 3 illustrates an example of transposition of the pth-stage Bloom filter array in the hierarchical Bloom filter.

FIG. 3 illustrates an example of transposition of the pth-stage Bloom filter array BF(p) in the hierarchical Bloom filter BF. In FIG. 3, (A) illustrates the Bloom filter array BF(p). In this case, the Bloom filter array BF(p) is illustrated as being constituted by four divided Bloom filters bf(p-1) to bf(p-4). That is, the Bloom filter array BF(p) is a bit string of 8 bits×4 filters. When the Bloom filter array BF(p) is transposed, a bit string of 4 bits×8 filters is obtained. That is, as a result of the transposition, the number of filters and the bit width are transposed.

In FIG. 3, (B) illustrates transposition of the Bloom filter array BF(p). For the transposition, bits at the same positions in the Bloom filters bf(p-1) to bf(p-4) are gathered and the bit strings gathered from the same positions are arranged in order of bit positions.

More specifically, the first bits of the Bloom filters bf(p-1) to bf(p-4) are grouped into a bit string {0110} in order of in-array filter numbers. That is, the first bit "0" from the left side is the first bit of the Bloom filter bf(p-1), the second bit "1" is the first bit of the Bloom filter bf(p-2), the third bit "1" is the first bit of the Bloom filter bf(p-3), and the last bit "0" is the first bit of the Bloom filter bf(p-4).

The bit string {0110} is referred to as a transposed Bloom filter tbf(p-1). Bits at the second to last bit positions are grouped in the same manner. As a result, transposed Bloom filters tbf(p-1) to tbf(p-8) are obtained. Index information obtained by arranging the transposed Bloom filters tbf(p-1) to tbf(p-8) in order of bit positions is the transposed Bloom filter array tBF(p). As a result of generation of such transposed Bloom filter arrays tBF(p) for all stages, the hierarchical transposed Bloom filter tBF is obtained.

In FIG. 3, (C) illustrates a comparative example of search using the Bloom filter array BF(p) and search using the transposed Bloom filter array tBF(p). In this case, two hash values of target data Dx are determined according to two types of hash functions, and remainders after dividing the hash values by "8", which is the bit width of the Bloom filters bf(p) constituting the Bloom filter array BF(p), are assumed to be "4" and "8".

When the Bloom filter array BF(p) is used for search, the Bloom filters bf(p) in which all of the bits at the bit positions "4" and "8" corresponding to the remainders "4" and "8" are ON (i.e., "1") are searched for from the Bloom filter array BF(p). In this case, the Bloom filter bf(p-2) is found.

On the other hand, when the transposed Bloom filter array tBF(p) is used for search, the transposed Bloom filters tbf(p-4) and tbf(p-8) having the same in-array filter numbers as the remainders "4" and "8" are retrieved without searching for the Bloom filters bf(p) in which all of the bits at the bit positions "4 and "8" are ON, unlike the case of the Bloom filter array BF(p). An AND operation is then performed on the retrieved transposed Bloom filters tbf(p-4) and tbf(p-8) to thereby identify the bit position "2" where the bits in both of the transposed Bloom filters tbf(p-4) and tbf(p-8) are ON.

In the case of the Bloom filter array BF(p), since the fourth and eighth bits in the four Bloom filters bf(p-1) to bf(p-4) are referred to, eight (=4×2) memory accesses is performed. In contrast, the transposed Bloom filter array tBF(p) is index information aggregated according to the bit positions of the pre-transposition Bloom filters bf(p-1) to bf(p-4). Thus, a determination can be made through two memory accesses for retrieving the transposed Bloom filters tbf(p-4) and tbf(p-8) and an AND operation therefor. As a result, the number of memory accesses is reduced and the search speed is increased, compared to the hierarchical Bloom filter BF.

The hierarchical transposed Bloom filter tBF obtained as described above is divided according to the index ranges and the resulting transposed Bloom filters are allocated to the multiple nodes. With this arrangement, in the search processing of each node, the number of memory accesses is reduced and the search speed is increased. In addition, since the transposed Bloom filters are distributed to the multiple nodes, the entire index range of the nodes can be increased compared to a case of a single node. Thus, the manageable amount of data is increased, so that duplicated data can be searched for in a large range, which facilitates finding of search-target data.

Figure 4:
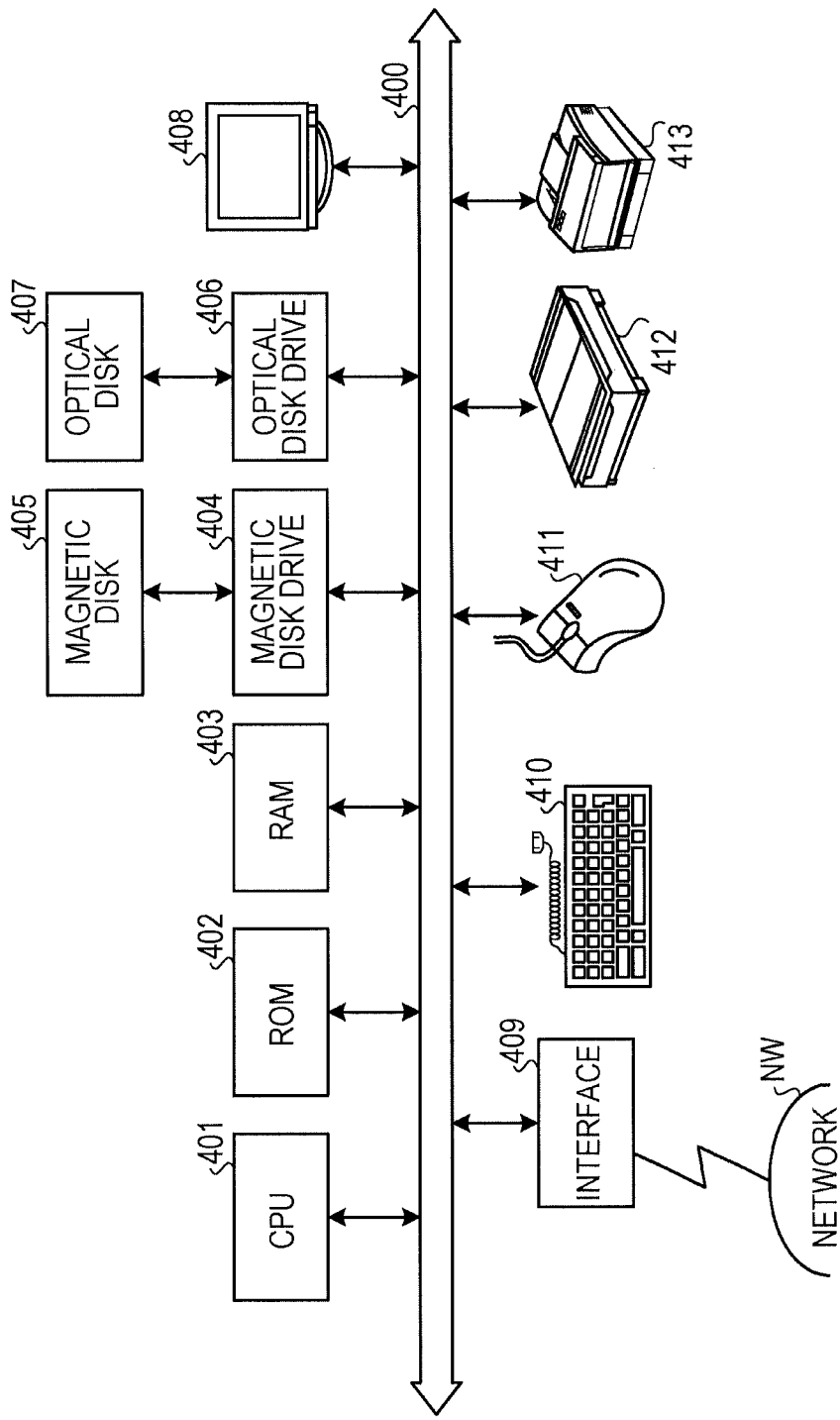
FIG. 4 is a block diagram illustrating an exemplary hardware configuration of a computer (corresponding to nodes, a management server, and clients) according to the present embodiment.

FIG. 4 is a block diagram illustrating an exemplary hardware configuration of a computer (corresponding to the nodes N1 to N4, the management server M, and the clients C1 to C3) according to the present embodiment. As illustrated in FIG. 4, the computer according to the embodiment serves as a search apparatus and includes a CPU (central processing unit) 401, a ROM (read only memory) 402, a RAM (random access memory) 403, a magnetic disk drive 404, a magnetic disk 405, an optical disk drive 406, an optical disk 407, a display 408, an interface 409, a keyboard 140, a mouse 411, a scanner 412, and a printer 413. Those elements are interconnected through a bus 400.

The CPU 401 controls the overall computer. The ROM 402 stores programs, such as a boot program. The RAM 403 may be used as a work area for the CPU 401. Under the control of the CPU 401, the magnetic disk drive 404 controls writing/reading of data into/from the magnetic disk 405. The magnetic disk 405 stores data written under the control of the magnetic disk drive 404.

Under the control of the CPU 401, the optical disk drive 406 controls writing/reading of data into/from the optical disk 407. Data written under the control of the optical disk drive 406 is stored in the optical disk 407 and also the computer reads out data stored in the optical disk 407.

The display 408 displays, for example, a cursor, icons, toolboxes, as well as documents, images, and data of functional information and so on. Examples of the display 408 include a CRT (cathode ray tube) display, a TFT (thin film transistor) liquid crystal display, and a plasma display.

The interface 409 is connected with a network NW through a communications line and is connected with an external apparatus through the network NW. The interface 409 interfaces between the network NW and the internal elements to control input/output of data into/from the external apparatus. The interface 409 may be implemented by, for example, a modem or a LAN adapter.

The keyboard 410 is used to input data and has keys for inputting characters, numeric values, various instructions, and so on. The keyboard 410 may be a touch-panel input pad, a numerical keypad, or the like. The mouse 411 may be used to move the cursor, select a range, move a window, or change the size of the window. The keyboard 410 may also be any device having a pointing-device function. Examples include a trackball and a joystick.

The scanner 412 optically reads out an image and captures image data into the computer. The scanner 412 may also have an OCR (optical character reader) function. The printer 413 prints image data and document data. The printer 413 may also be implemented by, for example, a laser printer or an inkjet printer.

Entry processing will be described next. The entry processing involves data entry processing for registering data that serves as an entry (which may hereinafter be referred to as "target data") and filter entry processing on a group of divided hierarchical transposed Bloom filters. A description will first be given below with reference to FIG. 5.

Figure 5:
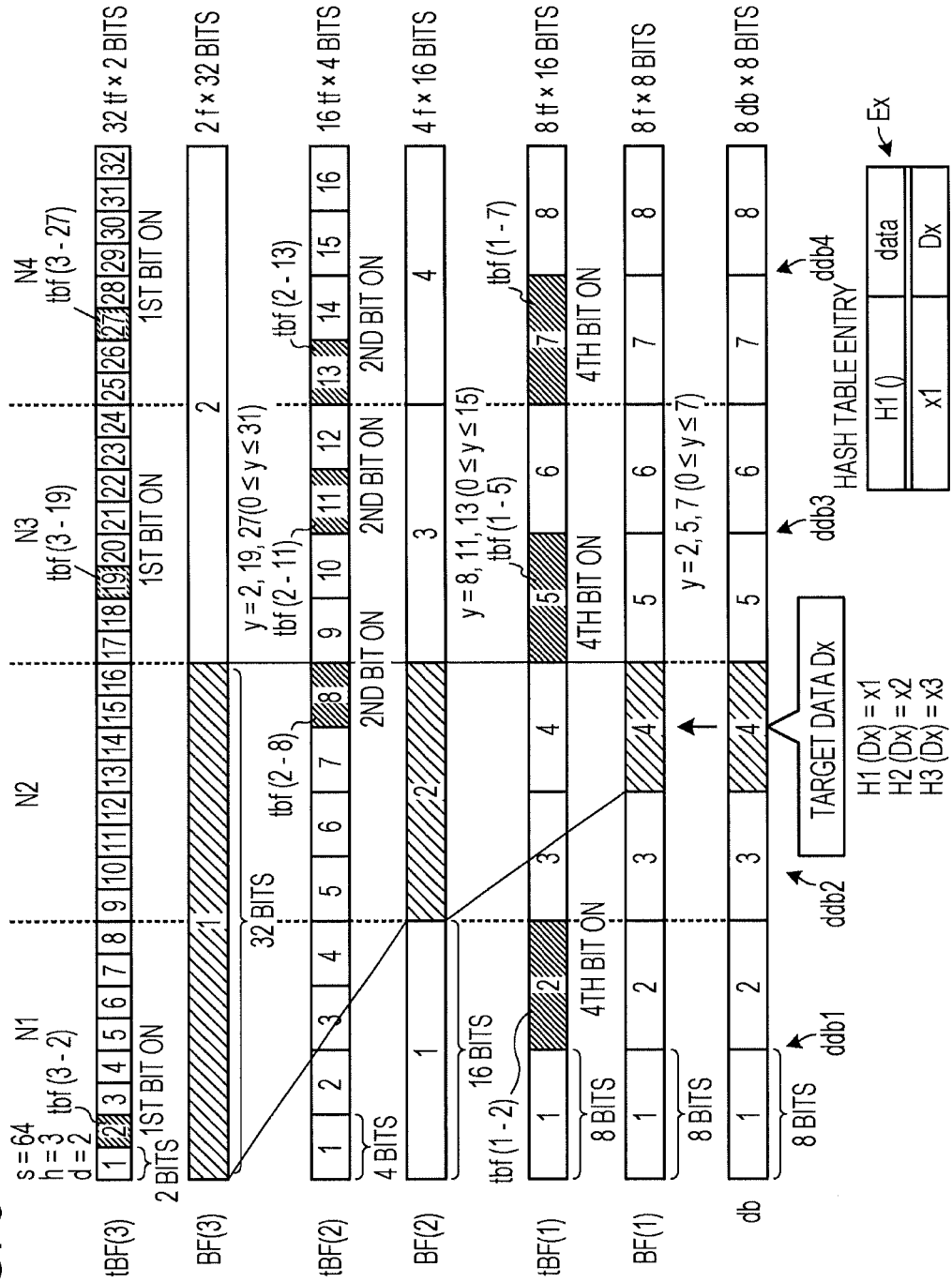
FIG. 5 illustrates one example of entry processing.

FIG. 5 illustrates one example of entry processing. In this case, a description will be given in conjunction with an example of the group of hierarchical transposed Bloom filters (tBF1 to tBF4) illustrated in FIG. 1. In FIG. 5, it is assumed that target data Dx has yet to be added as an entry to the data block set db. Although a computer that executes the entry processing may be any of the management server M and the clients C1 to C3, the computer in this case is assumed to be the management server M by way of example.

An example of data entry processing will be described first. The number "k" of types of hash functions through which target data Dx to be registered is run is given as k=3. In this example, hash functions H1( ), H2( ), and H3( ) are used. In this case, the hash function for hash values to be registered in the hash tables HT1 to HT8 is assumed to be H1( ).

First, the management server M specifies a node (a registration-destination node) in which the target data Dx is to be registered. The user of the management server M may arbitrarily specify to which node the entry of the target data is to be added. The node to which the entry of the target data is added is pre-specified according to an available space of each node. Each node may report the available space of the node to the management server M periodically or in response to an instruction from the management server M. In the example in FIG. 5, it is assumed that the node N2 is specified.

Hash values obtained by running the target data Dx through the hash functions H1( ), H2( ), and H3( ) are assumed to be values as given by:

$$H1(Dx)=x1$$

$$H2(Dx)=x2$$

$$H3(Dx)=x3$$

In the entry processing, a specific bit in the transposed Bloom filter tbf(p) to be updated is turned ON. When the specific bit is already ON, the bit status is maintained.

The management server M creates a hash table entry Ex with respect to the target data Dx. The management server M then transmits the created hash table entry Ex to the node N2 that is a registration-destination node. In the example in FIG. 5, the node N2 is assumed to have registered the target data Dx into the data block db4 in the divided data block set ddb2.

In this case, the hash table entry Ex is added to the hash table HT4 in the node N2. In practice, the target data Dx is stored in the data block db4, and the hash value x1 and a pointer to the target data Dx stored in the data block db4 are associated with each other in the hash table HT4.

When the entry to the hash table HT4 is completed, the node N2 transmits a reply to the management server M. This reply includes the block number of the data block in which the target data Dx is registered (the data block may hereinafter be referred to as "registration-destination data block"). In this case, the reply includes the block number "4" of the registration-destination data block db4.

An example of filter entry processing will be described next. The first-stage filter entry processing is executed first. The management server M identifies the transposed Bloom filters tbf(1) to be updated in the first-stage transposed Bloom filter array tBF(1). More specifically, the management server M divides the hash values x1 to x3 by "8", which is the number of transposed Bloom filters in the first-stage transposed Bloom filter array tBF(1), to determine remainders. The remainders serve as pieces of position information indicating the respective positions of the arranged transposed Bloom filters.

It is assumed in this case that the remainder of the hash value x1 is "2", the remainder of the hash value x2 is "5", and the remainder of the hash value x3 is "7". Thus, the transposed Bloom filters tbf(1) to be updated at the first stage are transposed Bloom filters tbf(1-2), tbf(1-5), and tbf(1-7).

At the first stage (the lowest stage), bit positions corresponding to the block number 4 of the registration-destination data block db4 specified by the reply are determined to be bits to be updated. The management server M identifies the index ranges of the transposed Bloom filters tbf(1-2), tbf(1-5), and tbf(1-7) to be updated at the first stage.

For example, since the bit width of the first-stage transposed Bloom filters tbf(1) is 8 bits, the index range of the second transposed Bloom filter tbf(1-2) from the beginning is the range of the 9th to 16th bits. Through reference to the association table T, the index range of the second transposed Bloom filter tbf(1-2) is identified to be the index range of the node N1. Thus, the transposed Bloom filter tbf(1-2) is identified as belonging to the node N1. Similarly, the transposed Bloom filters tbf(1-5) and tbf(1-7) are also identified as belonging to the nodes N3 and N4, respectively. The management server M issues, to the nodes N1, N3, and N4, notifications indicating the respective bit positions to be updated.

Upon receiving the notifications, the nodes N1, N3, and N4 turn on the fourth bits from the beginnings of the transposed Bloom filters tbf(1) to be updated. After the update, the filter entry processing of the first-stage transposed Bloom filter array tBF(1) ends.

Next, filter entry processing on the second stage is executed. The management server M identifies the transposed Bloom filters tbf(2) to be updated in the second-stage transposed Bloom filter array tBF(2). More specifically, the management server M divides the hash values x1 to x3 by "16", which is the number of transposed Bloom filters in the second-stage transposed Bloom filter array tBF(2), to determine remainders.

It is assumed in this case that the remainder of the hash value x1 is "8", the remainder of the hash value x2 is "11", and the remainder of the hash value x3 is "13". Thus, the transposed Bloom filters tbf(2) to be updated at the second stage are transposed Bloom filters tbf(2-8), tbf(2-11), and tbf(2-13).

Next, a description will be given of at which bit positions in the transposed Bloom filters tbf(2-8), tbf(2-11), and tbf(2-13) the bits are turned ON. As described above, in the pre-transposition hierarchical Bloom filter BF, each Bloom filter array BF(p) is divided by the division number "d" into n Bloom filters (where $n=d^{[h-(p-1)]}$). As a result of the division, the bit width of each Bloom filter array BF(p) is given as m (=s/n) bits.

Thus, in the hierarchical Bloom filter BF, the Bloom filters bf(p) including the bit positions of the Bloom filters bf((p-1)-#) to be updated at the (p-1)th stage is identified from the pth-stage Bloom filter array BF(p).

In contrast, since the number "n" of filters and the bit width "m" are transposed in the hierarchical transposed Bloom filter tBF, the bit position to be updated at the (p-1)th stage, not the in-array filter number # of the Bloom filter bf((p-1)-#) to be updated at the (p-1)th stage, is divided by the division number "d" and the resulting value is rounded up. The division number "d" is equal to, after the transposition, the bit width of the transposed Bloom filters tbf(h) at the highest stage "h".

As described above, the bits to be updated at the first stage (which is the previous stage of the second stage) are the fourth bits from the beginnings, so that the fourth bits of the transposed Bloom filters tbf(1-2), tbf(1-5), and tbf(1-7) are turned ON. Thus, for the second stage, since d is 2, the bits to be updated at the second stage are determined to be the second (=4/d) bits from the beginnings.

In this example, the second bits from the beginnings of the transposed Bloom filters tbf(2-8), tbf(2-11), and tbf(2-13) are bit positions to be updated. As in the first stage, the management server M uses the bit width (4 bits for the second stage) of the transposed Bloom filters tbf and the association table T to identify the nodes N2 to N4 having the transposed Bloom filters tbf(2-8), tbf(2-11), and tbf(2-13) to be updated at the second stage. The management server M thus issues, to the nodes N2 to N4, notifications indicating the bit positions to be updated.

Upon receiving the notifications, the nodes N2 to N4 turn on the second bits from the beginnings of the transposed Bloom filters tbf(2) to be updated. After the processing, the filter entry processing of the second-stage transposed Bloom filter array tBF(2) ends.

Next, filter entry processing is executed on the third stage (the highest stage). The management server M identifies the transposed Bloom filters tbf(3) to be updated in the third-stage transposed Bloom filter array tBF(3). More specifically, the management server M divides the hash values x1 to x3 by "32", which is the number of transposed Bloom filters in the third-stage transposed Bloom filter array tBF(3), to determine remainders.

It is assumed in this case that the remainder of the hash value x1 is "2", the remainder of the hash value x2 is "19", and the remainder of the hash value x3 is "27". Thus, the transposed Bloom filters tbf(3) to be updated at the third stage are transposed Bloom filters tbf(3-2), tbf(3-19), and tbf(3-27).

Next, bit positions to be updated in transposed Bloom filters tbf(3-2), tbf(3-19), and tbf(3-27) are determined. As in the second stage, the bit position to be updated at the (p-1)th stage, not the in-array-filter number # of the Bloom filter bf((p-1)-#) to be updated at the (p-1)th stage, is divided by the division number "d" and the resulting value is rounded up.

As described above, the bits to be updated at the second stage (which is the previous stage of the third stage) are the second bits from the beginnings, so that the second bits of the transposed Bloom filters tbf(2-8), tbf(2-11), and tbf(2-13) are turned ON. Thus, for the third stage, since d is 2, the bits to be updated at the third stage are determined to be the first (=2/d) bits from the beginnings.

In this example, the first bits from the beginnings of the transposed Bloom filters tbf(3-2), tbf(3-19), and tbf(3-27) are bit positions to be updated. As in the first and second stages, the management server M uses the bit width (2 bits for the third stage) of the transposed Bloom filters tbf and the association table T to identify the nodes N1, N3, and N4 having the transposed Bloom filters tbf(3-2), tbf(3-19), and tbf(3-27) to be updated at the third stage. The management server M then issues, to the nodes N1, N3, and N4, notifications indicating the bit positions to be updated.

Upon receiving the notifications, the nodes N1, N3, and N4 turn on the first bits from the beginnings of the transposed Bloom filters tbf(3) to be updated. After the processing, the filter entry processing of the third-stage transposed Bloom filter array tBF(3) ends.

Figure 6:
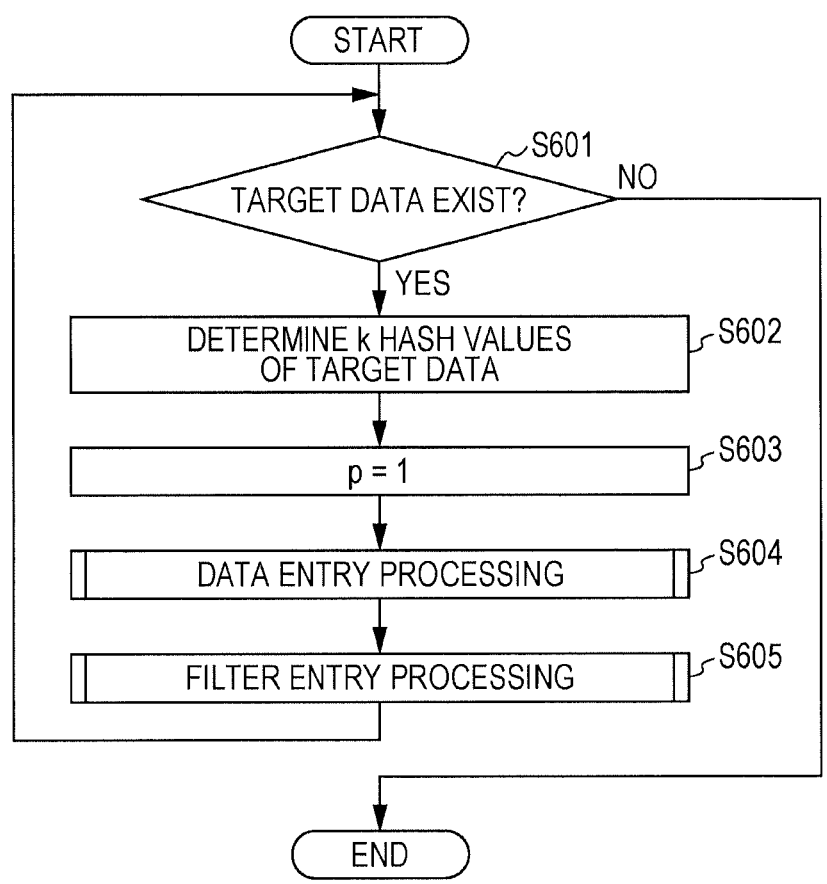
FIG. 6 is a flowchart illustrating an example of a procedure of entry processing performed by a registering computer according to the embodiment.

FIG. 6 is a flowchart illustrating an example of a procedure of entry processing performed by a registering computer according to the embodiment. The computer for executing the entry processing is, for example, the management server M or the client and is simply referred to as a "registering computer" hereinafter. In S601, the registering computer determines whether or not the target data the user wishes to register (e.g., the target data Dx illustrated in FIG. 5) exists. When the target data Dx (Yes in S601) exists, the process proceeds to S602 in which the registering computer determines k hash values by running the target data through k types of hash functions (Including H1( )). In S603, the registering computer sets the stage number p to 1. The registering computer performs data entry processing in S604 and performs filter entry processing in S605.

Thereafter, the process returns to S601. When the target data he or she wishes to register (No in S601) does not exist, the computer ends the entry processing. Thus, the data entry processing and the filter entry processing are executed on the target data Dx, as illustrated in FIG. 5. In this state, the target data Dx can be searched for.

Figure 7:
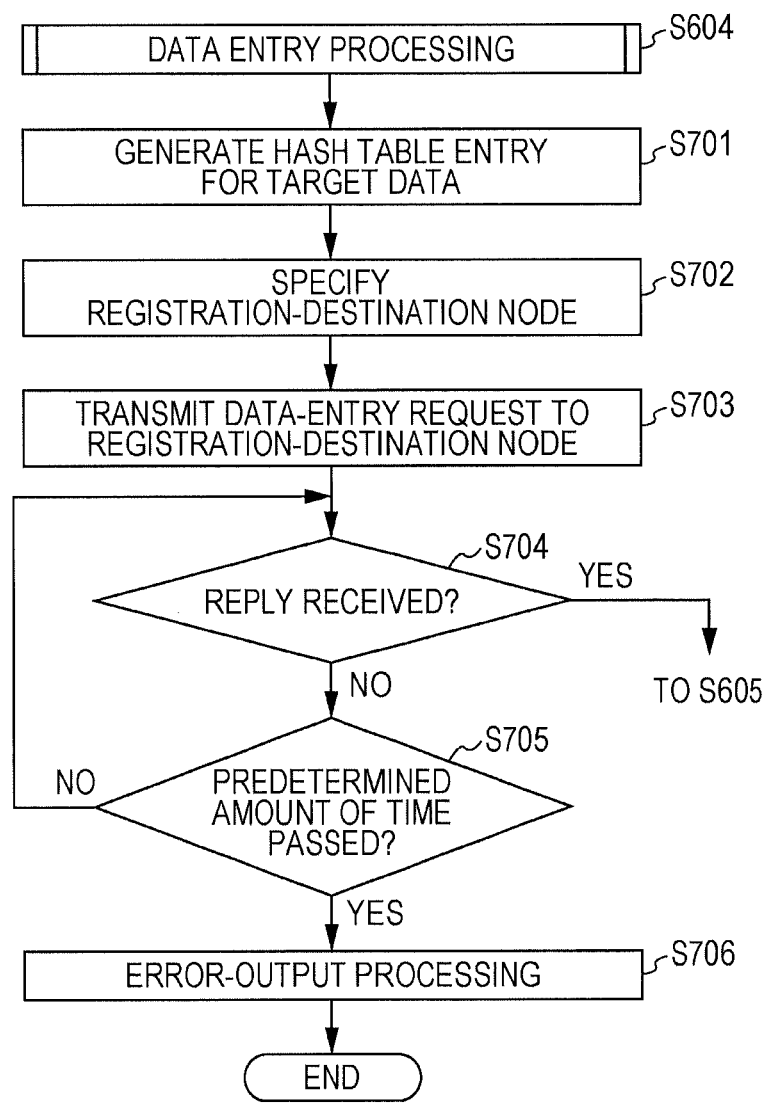
FIG. 7 is a flowchart illustrating an example of a detailed procedure of data entry processing illustrated in FIG. 6.

FIG. 7 is a flowchart illustrating an example of a detailed procedure of the data entry processing illustrated in FIG. 6. Referring to FIG. 7, first, in S701, the registering computer generates a hash table entry for the target data Dx. For example, the registering computer generates a hash table entry Ex, as illustrated in FIG. 5.

In S702, the registering computer then specifies a registration-destination node. More specifically, for example, the user of the management server M may operate an input device to arbitrarily specify the registration-destination node. The node to which the entry of the target data Dx is to be added may be pre-specified according to an available space of each node. In the example in FIG. 5, the node N2 is specified.

In S703, the registering computer transmits a data-entry request 801 (described below with reference to FIG. 8A) to the registration-destination node. In S704, the registering computer waits to receive a reply 802 (described below with reference to FIG. 8B) that is transmitted from the registration-destination node in response to the data-entry request 801.

FIG. 8A illustrates an example of the data structure of the data entry request 801 and FIG. 8B illustrates an example of the data structure of the reply 802. The examples of the data structures in FIGS. 8A and 8B correspond to the example of the data entry processing illustrated in FIG. 5. A header of the data-entry request 801 illustrated in FIG. 8A contains a source address and a destination address of the data-entry request 801. In the example in FIG. 8A, characters M and N2 allocated to the computers are illustrated in place of the addresses thereof.

Payload of the data-entry request 801 illustrated in FIG. 8A has information in a type field, an attribute field, a hash-value field, and a registration-data field. For example, the type field contains "registration", the attribute field contains "data entry", the hash-value field contains "x1", and the registration-data field contains "Dx".

A header of the reply 802 illustrated in FIG. 8B contains a source address and a destination address, which are interchanged relative to the source address and the destination address of the data entry request 801. Payload in the reply 802 illustrated in FIG. 8B contains block number "4" of the data block db4 in which the target data Dx (which is registration data) is registered.

Referring back to FIG. 7, when the reply 802 is not received (No in S704), the process proceeds to S705 in which the registering computer determines whether or not a predetermined amount of time has passed from the issuance of the data entry request 801. When the predetermined amount of time has not passed (No in S705), the process returns to S704. On the other hand, when the predetermined amount of time has passed (Yes in S705), the registering computer performs error-output processing in S706. For example, the display 408 may display information indicating that the data entry failed.

On the other hand, when the reply 802 is received (Yes in S704), the registering computer executes the filter entry processing in S605. As a result of the data entry processing in S604, the target data Dx is registered in the specified registration-destination node in association with the hash value of the target data Dx.

Figure 9:
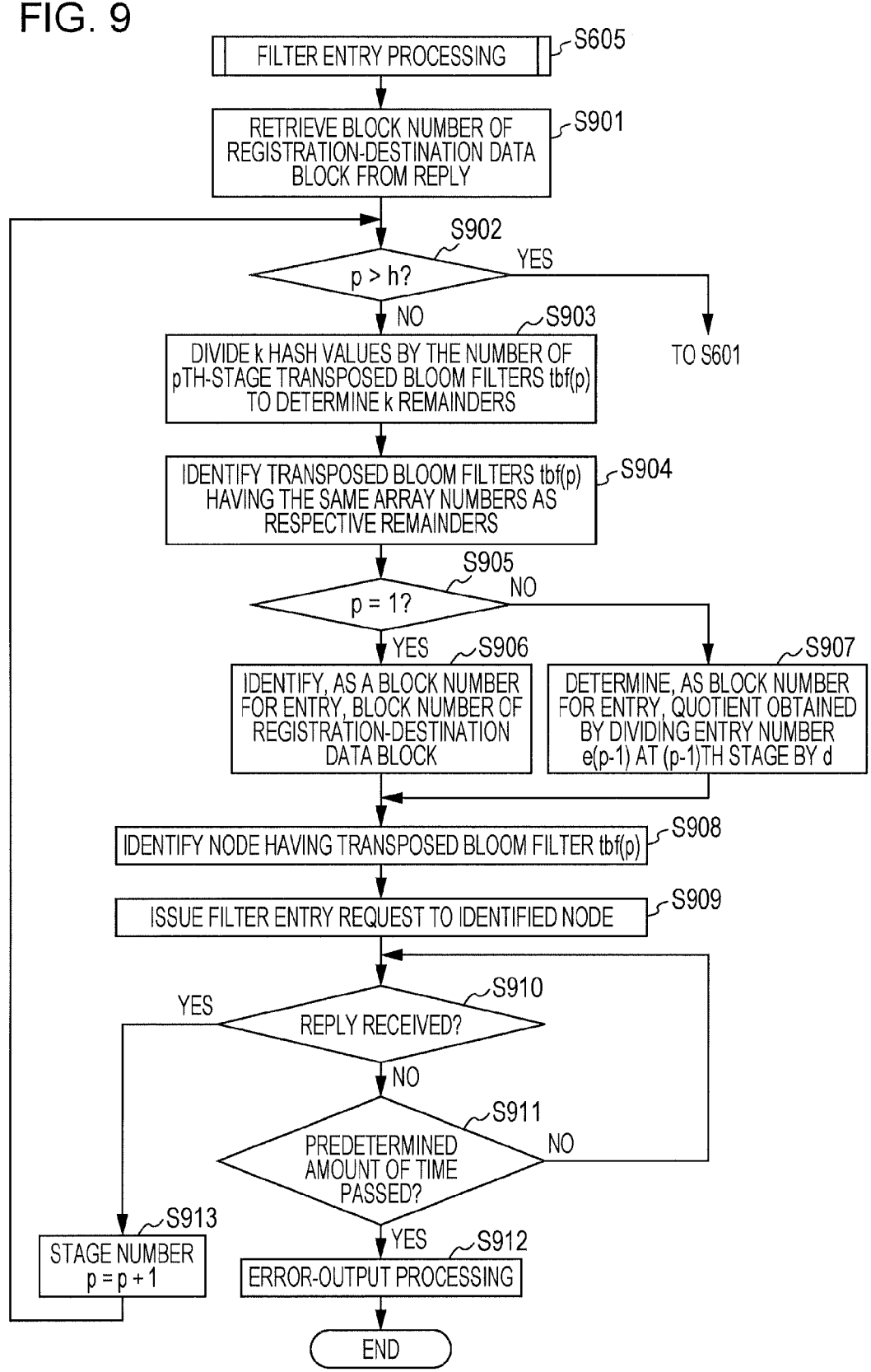
FIG. 9 is a flowchart illustrating an example of a detailed procedure of filter entry processing illustrated in FIG. 6.

FIG. 9 is a flowchart illustrating an example of a detailed procedure of the filter entry processing illustrated in FIG. 6. Referring to FIG. 9, first, in S901, the registering computer retrieves the block number of the registration-destination data block from the reply 802 received in S704 in FIG. 7. In the example in FIG. 8B, the registering computer retrieves "4" as the block number.

Next, in S902, the registering computer determines whether or not p>h is satisfied (where h indicates the highest stage number of the group of divided hierarchical transposed Bloom filters). When p>h is not satisfied (No in S902), the process proceeds to S903 in which the registering computer divides k hash values by the number of pth-stage transposed Bloom filters tbf(p) to determine k remainders. The registering computer may pre-store the bit width "s" of the hierarchical transposed Bloom filter tBF and the number of transposed Bloom filters for each stage.

In S904, the registering computer identifies the k transposed Bloom filters tbf(p) having the same in-array filter numbers as the k remainders. In S905, the registering computer determines whether or not p is equal to 1. When p is equal to 1 (Yes in S905), the process proceeds to S906 in which the registering computer identifies, as a block number for entry, the registration-destination data-block number retrieved in S901. In the example in FIG. 5, since the block number is "4", the block number for entry is "4".

On the other hand, when p is not equal to 1 (No in S905), the process proceeds to S907. In S907, with respect to the identified k transposed Bloom filters tbf(p), the registering computer determines, as a block number for entry, a (rounded up) quotient obtained by dividing the bit position (the entry number e(p-1)) where the target data Dx is to be updated at the (p-1)th stage by the division number "d". In the example in FIG. 5, in the case of the second stage, a quotient "2" obtained by dividing "4", which is the bit position to be updated at the first stage, by the division number (=2) at the highest stage before the transposition is the block number for entry.

Subsequent to S S906 or S907, in S908, the registering computer identifies the node having the transposed Bloom filter tbf(p). In the example of the first stage, since the bit width of the first-stage transposed Bloom filters tbf is 8 bits, the index range of the second transposed Bloom filter tbf(1-2) from the beginning is the range of the 9th to 16th bits. Through reference to the association table T, the index range of the second transposed Bloom filter tbf(1-2) is identified to be the index range of the node N1.

In S909, the registering computer issues a filter entry request 1000 (described blow with reference to FIG. 10) to the node identified in S908. In S910, the registering computer waits for the reply 802 (ACK).

Figure 10:
FIG. 10 illustrates an example of the data structure of a filter entry request.

FIG. 10 illustrates an example of the data structure of the filter entry request. The example of the data structure illustrated in FIG. 10 corresponds to the example of the data entry processing at the first stage illustrated in FIG. 5. A header of the filter entry request 1000 illustrated in FIG. 10 contains a source address and a destination address of the filter entry request 1000. In the example in FIG. 10, characters M and N1 allocated to the computers are illustrated in place of the addresses thereof.

Payload of the filter entry request 1000 illustrated in FIG. 10 has information in a type field, an attribute field, an identified transposed Bloom filter field, and an identified block number field. For example, the type field contains "registration", the attribute field contains "filter entry", the identified transposed Bloom filter field contains the identifier "tbf(1-2)" of the identified transposed Bloom filter (since the identified node (destination) is N1), and the identified block number field contains "4".

In the identified transposed Bloom filter field, the identifier of the transposed Bloom filter may be the index range indicating the bit positions of the identified transposed Bloom filter. For example, for the transposed Bloom filter tbf(1-2), the identifier of the identified transposed Bloom filter may be the index range of the 9th to 16th bits.

Referring back to FIG. 9, when no reply is received (No in S910), the process proceeds to S911 in which the registering computer determines whether or not a predetermined amount of time has passed from the issuance of the filter entry request 1000. When the predetermined amount of time has not passed (No in S911), the process returns to S910. On the other hand, when the predetermined amount of time has passed (Yes in S911), the registering computer performs error-output processing in S912. For example, the display 408 may display information indicating that the filter entry failed.

On the other hand, when the reply is received (Yes in S910), the registering computer increments the stage number "p" by "1" in S913 and the process returns to S902. When the registering computer determines that p>h is satisfied (Yes in S902), the process returns to S601 and the filter entry processing (S605) ends. As a result of the filter entry processing (S605), a filter for searching for the target data is set.

Figure 11:
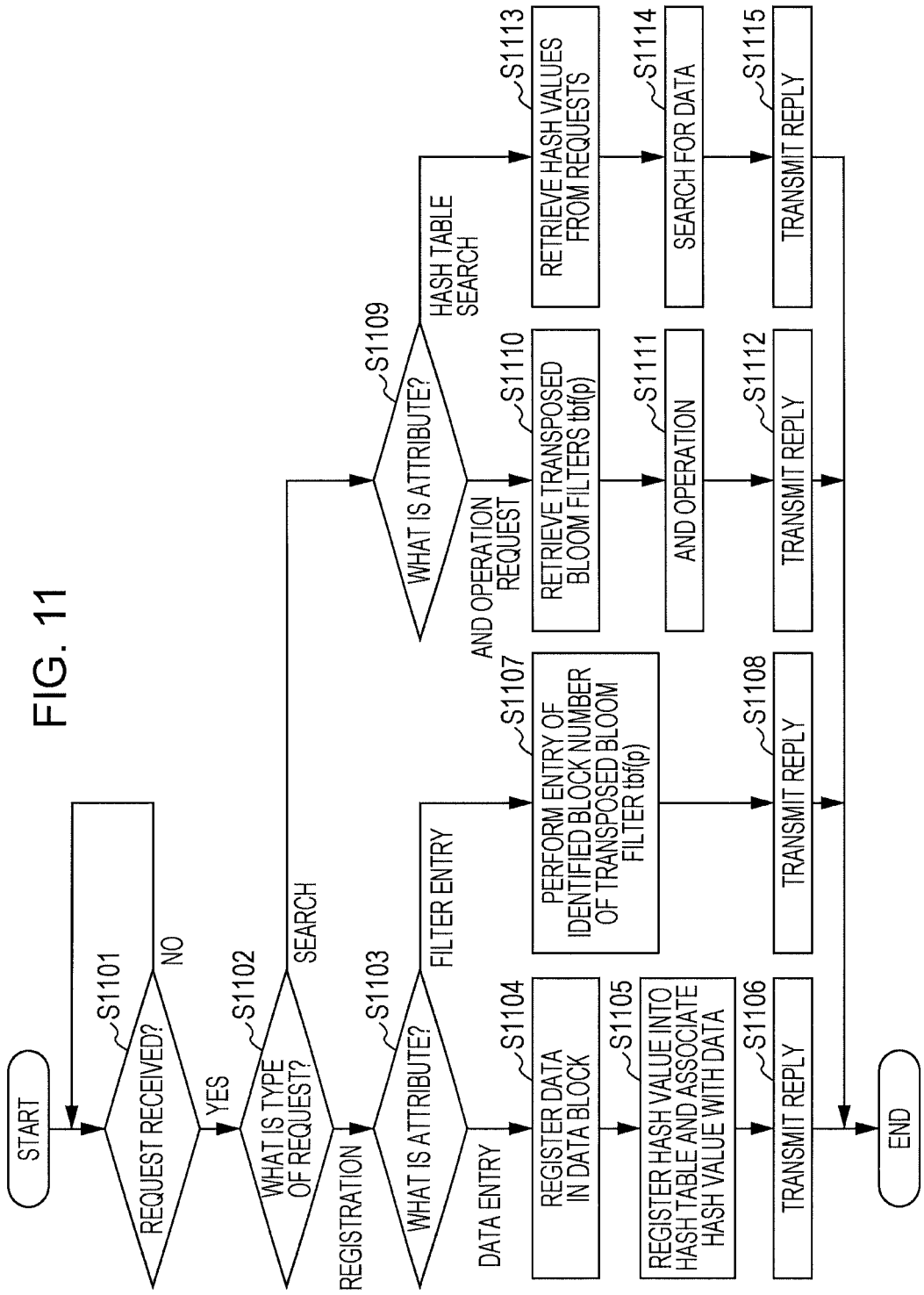
FIG. 11 is a flowchart illustrating an example of a detailed procedure of entry processing performed by the node according to the embodiment.

FIG. 11 is a flowchart illustrating an example of a detailed procedure of the entry processing performed by the node according to the embodiment. The processing procedure illustrated in FIG. 11 is executed by any of the nodes (the nodes N1 to N4).

First, the node waits to receive a request (No in S1101). When a request is received (Yes in S1101), the node identifies the type of request in S1102. More specifically, the node determines whether the type field in the request indicates "registration" or "search".

When the type field indicates "registration" (Registration in S1102), the node identifies an attribute in S1103. More specifically, the node determines whether the attribute field in the request indicates "data entry" or "filter entry". When the attribute field indicates "data entry" (Data Entry in S1103), the node determines that the received request is the data entry request 801. In this case, in S1104, the node registers the data in the registration-data field in the data entry request 801 into any of the held data blocks.

In S1105, the node registers the hash value in the hash-value field in the data entry request 801 into the hash table and associates the hash value with the data registered in S1104. Subsequently, in S1106, the node transmits the reply 802 including the block number of the registration-destination data block to the transmission source of the data entry request 801. After the transmission, the data entry processing performed by the node ends.

On the other hand, when the attribute indicates "filter entry" (Filter Entry in S1103), the node determines that the received request is the filter entry request 1000. In this case, in S1107, the node performs entry of the identified block number of the transposed Bloom filter tbf(p). More specifically, with respect to the transposed Bloom filter tbf(p) specified by the transposed Bloom filter field in the filter-entry request 1000, the node regards the bit position specified by the identified block number as a bit position to be updated and turns on the bit at the bit position to be updated.

Thereafter, in S1108, the node transmits, to the transmission source of the filter entry request 1000, a reply indicating that the entry is completed. After the transmission, the filter entry processing performed by the node ends. A processing procedure of S S1109 to S1115 subsequent to the case in which the type field indicates "search" in S1102 is described below.

Figure 12:
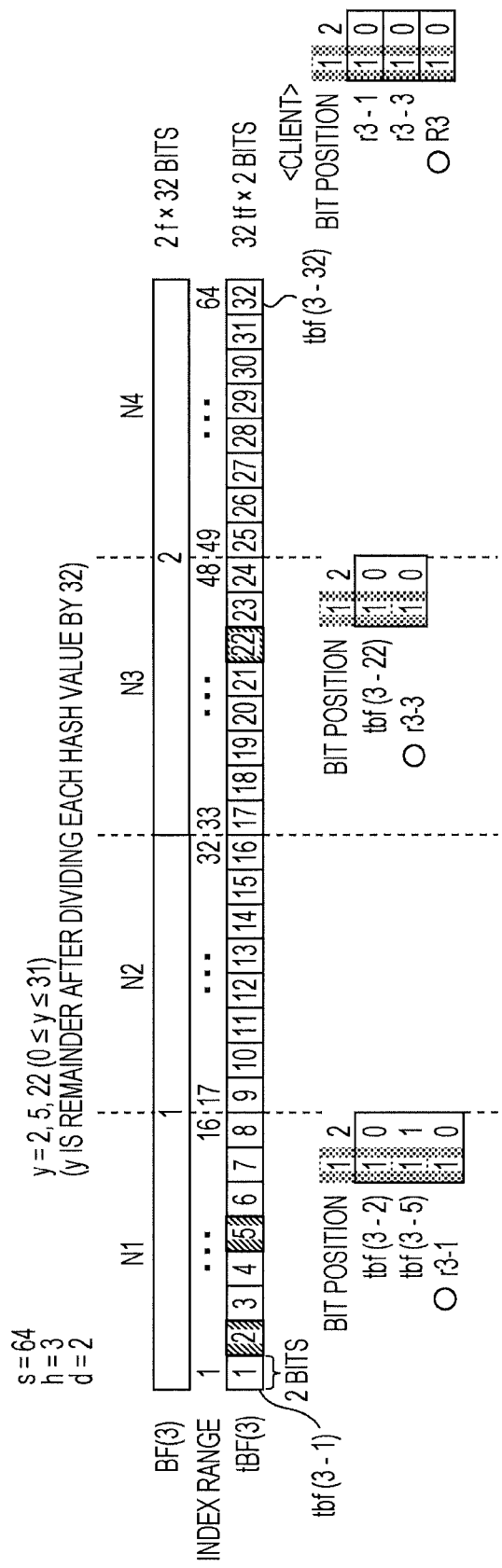
FIG. 12 is a diagram (a first part) illustrates an example of search processing.
Figure 13:
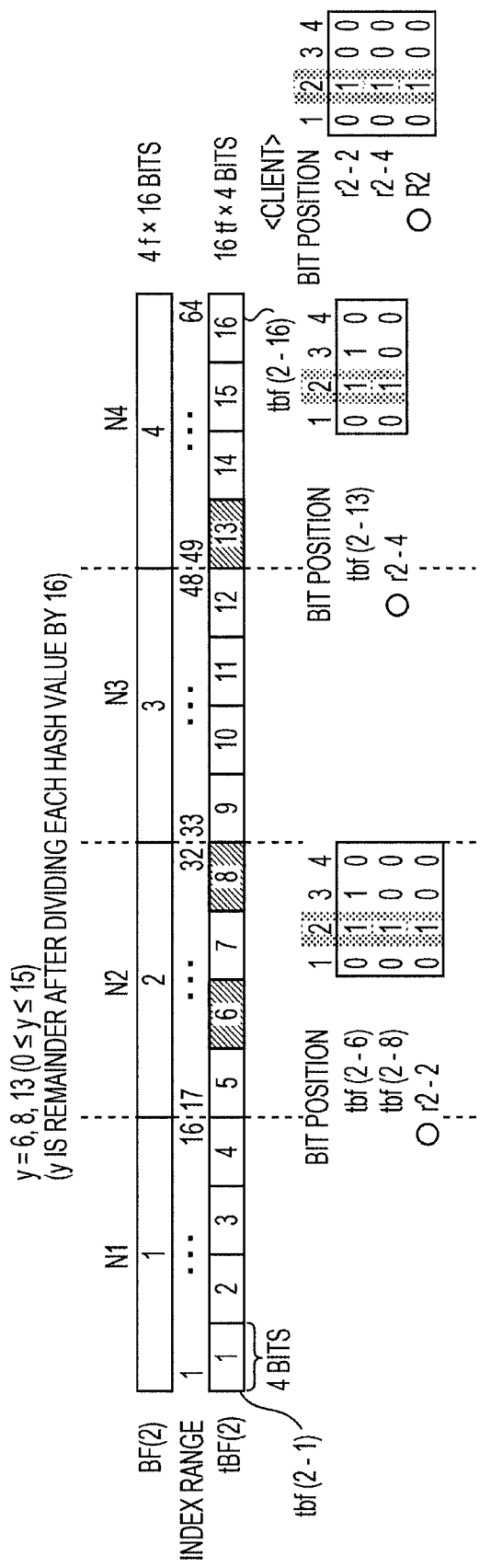
FIG. 13 is a diagram (a second part) of the example of the search processing.
Figure 14:
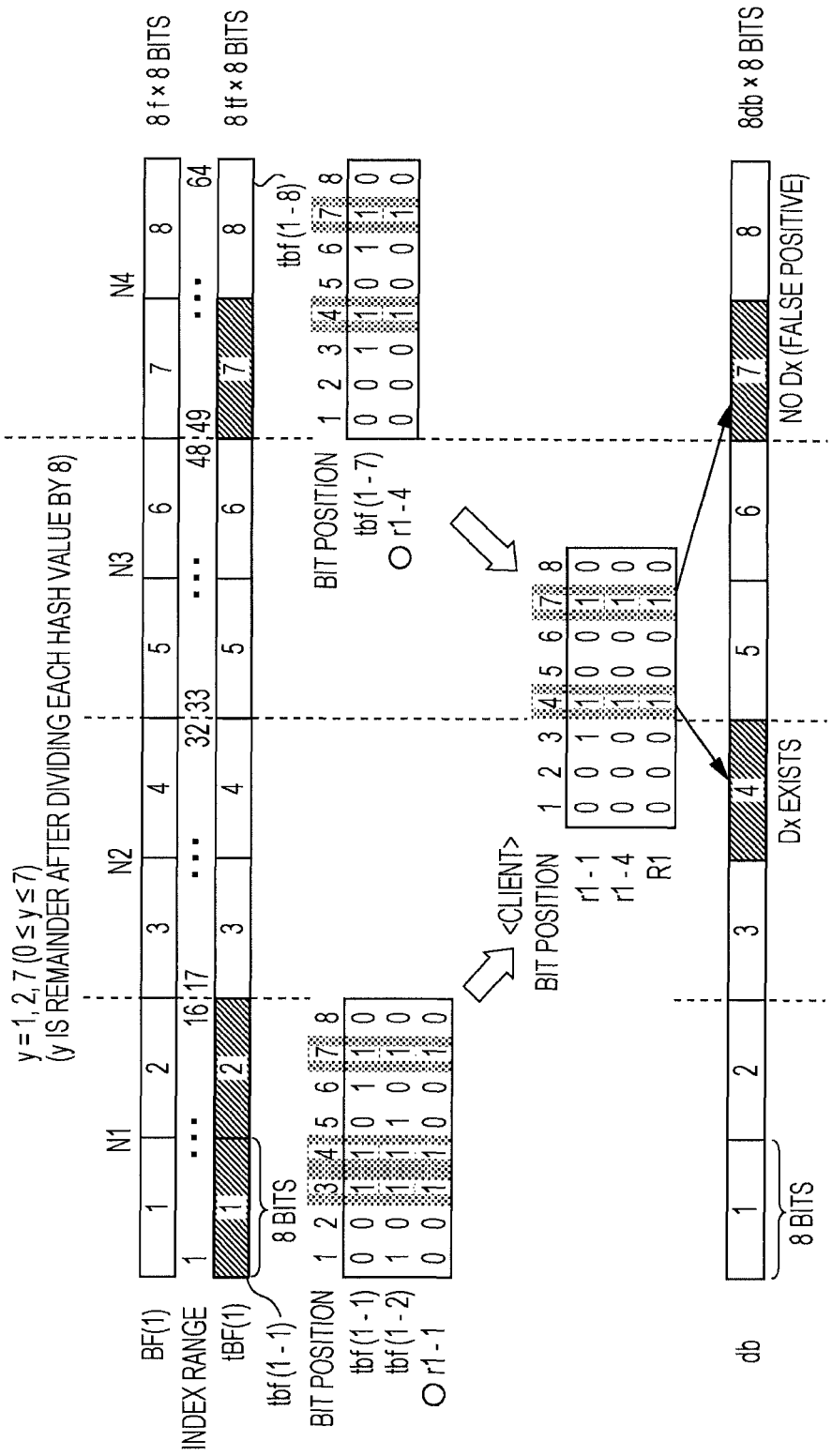
FIG. 14 is a diagram (a third part) of the example of the search processing.

Search Processing will be described next. When search-target data is given in the search processing, the group of divided hierarchical transposed Bloom filters is used to narrow down the search to perform processing for determining whether or not the search-target data exists in the group of nodes. A description will now be given with reference to FIGS. 12 to 14. In FIGS. 12 to 14, a description will be given in conjunction with an example of the group of hierarchical transposed Bloom filters tBF1 to tBF4 illustrated in FIG. 1. Although a searching computer that executes the search processing may be any of the management server M and the clients C1 to C3, the computer in this case is assumed to be the client C1 by way of example.

FIGS. 12 to 14 illustrate an example of the search processing. In FIGS. 12 to 14, for convenience of description, it is assumed that the total bit width "s" is 64 bits, the number "h" of stages is 3, and the division number "d" at the hth stage before the transposition is 2, as illustrated in FIG. 1.

In FIG. 12, the bit width of each of the Bloom filters constituting the Bloom filter array BF(3) at the third stage, which is the highest stage, is 32 ($=s/d^h=64/2^1$) bits. Thus, the transposed Bloom filter array tBF(3) at the third stage, which is the highest stage, is constituted by 32 ($=s/d^h=64/2^1$) transposed Bloom filters tbf(3-1) to tbf(3-32).

In FIG. 13, the bit width of each of the transposed Bloom filters constituting the Bloom filter array BF(2) at the second stage is 16 ($=s/d^h=64/2^2$) bits. Thus, the transposed Bloom filter array tBF(2) at the second stage is constituted by 16 ($=s/d^h=64/2^2$) transposed Bloom filters tbf(2-1) to tbf(2-16).

In FIG. 14, the bit width of each of the Bloom filters constituting the Bloom filter array BF(1) at the first stage, which is the lowest stage, is 8 ($=s/d^h=64/2^3$) bits. Thus, the transposed Bloom filter array tBF(1) at the first stage, which is the lowest stage, is constituted by 8 ($=s/d^h=64/2^3$) transposed Bloom filters tbf(1-1) to tbf(1-8).

In FIGS. 12 to 14, the pre-transposition Bloom filter arrays BF(1) to BF(3) are also illustrated along with the transposed Bloom filter arrays tBF(1) to tBF(3), for convenience of description and for comparison.

First, in FIG. 12, the client C1 determines remainders "2", "5", and "22" obtained by dividing three hash values of the hash functions H1( ), H2( ), and H3( ) for the search-target data Dx by "32", which is the number of third-stage transposed Bloom filters.

Next, the client C1 identifies the transposed Bloom filters for filtering in the third-stage transposed Bloom filter array tBF(3). More specifically, the client C1 identifies the transposed Bloom filters tbf(3-2), tbf(3-5), and tbf(3-22) that are located at the same bit positions as the remainders (the last position when the remainder is 0).

Since the number of transposed Bloom filters tbf(3-1) to tbf(3-32) at the third stage is 32, the bit width of each transposed Bloom filter at the third stage is determined to be 2 bits by dividing the overall bit width "s" (=64 bits) by 32. As a result, the client C1 determines that the index range of the second transposed Bloom filter tbf(3-2) from the beginning is the range of the third to fourth bits.

Thus, by referring to the association table T, the client C1 identifies that the transposed Bloom filter tbf(3-2) belongs to the node N1. Similar processing is performed with respect to the transposed Bloom filters tbf(3-5) and tbf(3-22), so that the transposed Bloom filter tbf(3-5) is identified as belonging to the node N1 and the transposed Bloom filter tbf(3-22) is identified as belonging to the node N3.

The client C1 issues AND operation requests to the nodes N1 and N3 to which the identified transposed Bloom filters tbf(3-2), tbf(3-5), and tbf(3-22) belong. Upon receiving the AND operation requests, the nodes N1 and N3 execute AND operations on the corresponding identified transposed Bloom filters tbf(3-2), tbf(3-5), and tbf(3-22).

More specifically, for example, the node N1 executes an AND operation on the transposed Bloom filters tbf(3-2) and tbf(3-5) belonging to the node N1. In the case of FIG. 12, an AND result r3-1 (={10}) is obtained. The node N1 transmits the AND result r3-1 to the client C1. Similarly, since the transposed Bloom filter(s) identified as belonging to the node N3 is only the transposed Bloom filter tbf(3-22), an AND result r3-3 (=tbf(3-22)={10}) is obtained. The node N3 transmits the AND result r3-3 to the client C1. Since the AND operations are executed at only the relevant nodes in the manner described above, the efficiency of the search processing can be enhanced.

The client C1 executes an AND operation on the AND results r3-1 and r3-3, transmitted from the nodes N1 and N3, to obtain an AND result R3 (={10}). When "1" is not included in the AND result R3, the client C1 determines that the search-target data Dx does not exist in any of the data blocks db1 to db8. On the other hand, when "1" is included in the AND result R3, the search-target data Dx might have been registered and thus the stage is shifted to the next stage below. In the case of FIG. 12, since "1" exists at the first bit position in the AND result R3, the stage is shifted to the second stage (see FIG. 13), which is one stage below.

Next, in FIG. 13, with respect to the second stage, the client C1 first determines remainders "6", "8", and "13" obtained by dividing three hash values for the search-target data Dx by "16", which is the number of second-stage transposed Bloom filters.

Next, the client C1 identifies the transposed Bloom filters for filtering in the second-stage transposed Bloom filter array tBF(2). More specifically, the client C1 identifies the transposed Bloom filters tbf(2-6), tbf(2-8), and tbf(2-13) that are located at the same bit positions as the remainders (the last position when the remainder is 0).

Since the number of transposed Bloom filters tbf(2-1) to tbf(2-16) at the second stage is 16, the bit width of each transposed Bloom filter at the second stage is determined to be 4 bits by dividing the overall bit width "s" (=64 bits) by 16. As a result, the client C1 determines that the index range of the sixth transposed Bloom filter tbf(2-6) from the beginning is the range of the 21st to 24th bits.

Thus, by referring to the association table T, the client C1 identifies that the transposed Bloom filter tbf(2-6) belongs to the node N2. Similar processing is performed with respect to the transposed Bloom filters tbf(2-8) and tbf(2-13), so that the transposed Bloom filter tbf(2-8) is identified as belonging to the node N2 and the transposed Bloom filter tbf(2-13) is identified as belonging to the node N4.

The client C1 then issues AND operation requests to the nodes N2 and N4 to which the corresponding identified transposed Bloom filters tbf(2-6), tbf(2-8), and tbf(2-13) belong. Upon receiving the AND operation requests, the nodes N2 and N4 execute AND operations on the corresponding identified transposed Bloom filters tbf(2-6), tbf(2-8), and tbf(2-13).

More specifically, for example, the node N2 executes an AND operation on the transposed Bloom filters tbf(2-6) and tbf(2-8) belonging to the node N2. In the case of FIG. 13, an AND result r2-2 given as r2-2={0100} is obtained. The node N2 transmits the AND result r2-2 to the client C1. Similarly, since the transposed Bloom filter(s) identified as belonging to the node N4 is only the transposed Bloom filter tbf(2-13), an AND result r2-4 given as r2-4=tbf(2-13)={0100} is obtained. The node N4 transmits the AND result r2-4 to the client C1. Since the AND operations are executed at only the relevant nodes in the manner described above, the efficiency of the search processing can be enhanced.

The client C1 also executes an AND operation on the AND results r2-2 and r2-4, transmitted from the nodes N2 and N4, to obtain an AND result R2 (={0100}). When "1" is not included in the AND result R2, the client C1 determines that the search-target data Dx does not exist in any of the data blocks db1 to db8. On the other hand, when "1" is included in the AND result R2, the search-target data Dx might have been registered and thus the stage is shifted to the next stage below. In the case of FIG. 13, since "1" exists at the second bit position in the AND result R2, the stage is shifted to the first stage (see FIG. 14), which is one stage below.

Next, in FIG. 14, with respect to the first stage, the client C1 first determines remainders "1", "2", and "7" obtained by dividing three hash values for the search-target data Dx by "8", which is the number of first-stage transposed Bloom filters.

Next, the client C1 identifies the transposed Bloom filters for filtering in the first-stage transposed Bloom filter array tBF(1). More specifically, the client C1 identifies the transposed Bloom filters tbf(1-1), tbf(1-2), and tbf(1-7) that are located at the same bit positions as the remainders (the last position when the remainder is 0).

Since the number of transposed Bloom filters tbf(1-1) to tbf(1-8) at the first stage is 8, the bit width of each transposed Bloom filter at the first stage is determined to be 8 bits by dividing the overall bit width "s" (=64 bits) by 8. Thus, the client C1 determines that the index range of the first transposed Bloom filter tbf(1-1) from the beginning is the range of the first to eighth bits.

Thus, by referring to the association table T, the client C1 determines that the transposed Bloom filter tbf(1-1) belongs to the node N1. Similar processing is performed with respect to the transposed Bloom filters tbf(1-2) and tbf(1-7), so that the transposed Bloom filter tbf(1-2) is identified as belonging to the node N1 and the transposed Bloom filter tbf(1-7) is identified as belonging to the node N4.

The client C1 then issues AND operation requests to the nodes N1 and N4 to which the corresponding identified transposed Bloom filters tbf(1-1), tbf(1-2), and tbf(1-7) belong. Upon receiving the AND operation requests, the nodes N1 and N4 execute AND operations on the corresponding identified transposed Bloom filters tbf(1-1), tbf(1-2), and tbf(1-7).

More specifically, for example, the node N1 executes an AND operation on the transposed Bloom filters tbf(1-1) and tbf(1-2) belonging to the node N1. In the case of FIG. 14, an AND result r1-1 given as r1-1={00110010} is obtained. The node N1 transmits the AND result r1-1 to the client C1. Similarly, since the transposed Bloom filter(s) identified as belonging to the node N4 is only the transposed Bloom filter tbf(1-7), an AND result r1-4 given as r1-4=tbf(1-7)={00010010} is obtained. The node N4 transmits the AND result r1-4 to the client C1. Since the AND operations are executed at only the relevant nodes in the manner described above, the efficiency of the search processing can be enhanced.

The client C1 executes an AND operation on the AND results r1-1 and r1-4, transmitted from the nodes N1 and N4, to obtain an AND result R1 (={00010010}). When "1" is not included in the AND result R1, the client C1 determines that the search-target data Dx does not exist in any of the data blocks db1 to db8. On the other hand, when "1" is included in the AND result R1, the search-target data Dx might have been registered and thus the stage is shifted to the next stage below. In the case of FIG. 14, "1" exists at the fourth and seventh bit positions in the AND result R1.

In this case, no more stage below exists. Thus, because of false positives, there is a possibility that the search-target data Dx exists in the data blocks db4 and db7 corresponding to the bit positions 4 and 7 where the bits in the AND result R1 (={00010010}) are "1".

The index ranges of the data blocks db4 and db7 are the same as the index ranges of the first-stage transposed Bloom filters tbf(1-4) and tbf(1-7). Thus, the client C1 determines that the index range of the fourth transposed Bloom filter tbf(1-4) from the beginning is the range of the 25th to 32nd bits. Similarly, the client C1 determines that the index range of the transposed Bloom filter tbf(1-7) is the range of the 49th to 56th bits.

As a result, the data block db4 is identified as belonging to the node N2 and the data block db7 is identified as belonging to the node N4. Thus, the client C1 issues hash-table search requests to the nodes N2 and N4. Upon receiving the hash-table search requests, the nodes N2 and N4 search for, in the corresponding hash tables HT4 and HT7, data corresponding to the H1( ) hash values included in the requests.

In the example in FIG. 14, since the search-target data Dx is stored in the data block db4 in the node N2, the node N2 transmits, to the client C1, information indicating that the search-target data Dx exists. For example, when the search-target data Dx is an entry in a dictionary, commentary-text data stored in association with the search-target data Dx may also be read and be transmitted to the client C1 as a search result.

On the other hand, since the search-target data Dx is not stored in the data block db7 in the node N4 in this case, the node N4 transmits, to the client C1, information indicating that the search-target data Dx does not exist. When the client C1 transmits a request with respect to the data block db4 earlier, a search result indicating that the search-target data Dx exists is obtained and thus the request may not be transmitted to the node N4. With this arrangement, the speed of the search processing can be increased. Through the above-described procedure, the client C1 can search for target data at high speed and in a large area by using the group of divided hierarchical transposed Bloom filters.

Figure 15:
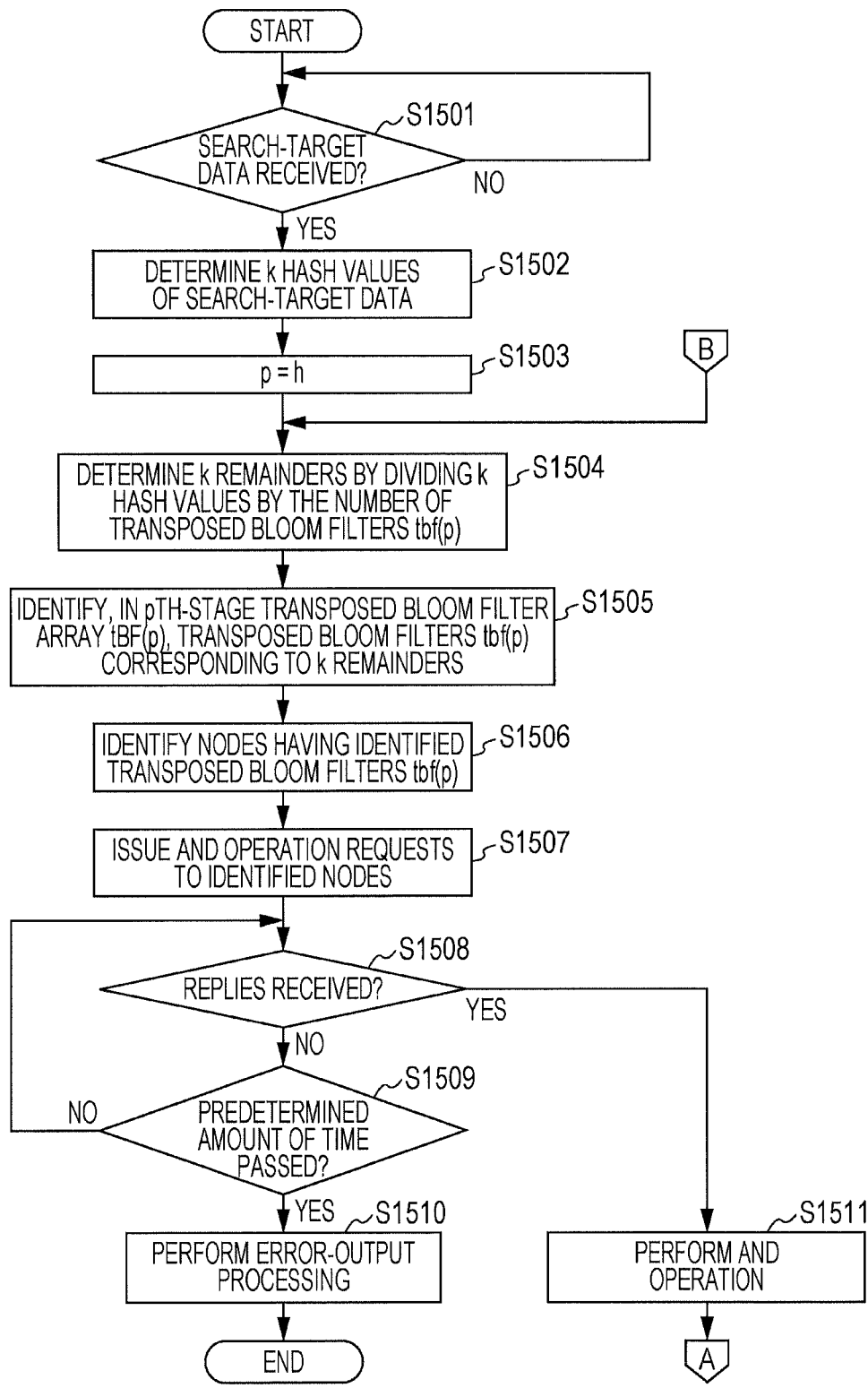
FIG. 15 is a flowchart (a first half) illustrating an example of a procedure of search processing performed by a searching computer according to the embodiment.

FIG. 15 is a flowchart (first part) illustrating an example of a procedure of search processing performed by a searching computer according to the embodiment. A computer for executing the search processing is, for example, the management server M or the client and is simply referred to as a "searching computer" hereinafter. The searching computer waits to receive search-target data Dx (No in S1501). When search-target data Dx is received (Yes in S1501), the process proceeds to S1502 in which the searching computer determines k hash values by running the search-target data Dx through k types of hash functions.

In S1503, the searching computer sets p=h, i.e., sets the stage number "p" to the largest stage number "h". In S1504, the searching computer determines k remainders by dividing the k hash values by the number of pth-stage transposed Bloom filters tbf(p). In S1505, the searching computer identifies, in the pth-stage transposed Bloom filter array tBF(p), k transposed Bloom filters tbf(p) corresponding to the k remainders.

In S1506, by referring to the association table T, the searching computer identifies the nodes having the k transposed Bloom filters tbf(p). Thereafter, in S1507, the searching computer issues AND operation requests (including an AND operation request 1601 described below with reference to FIG. 16A) to the nodes identified in S1506. In S1508, the searching computer waits to receive replies (including a reply 1602 illustrated in FIG. 16B) from the identified nodes.

FIG. 16A illustrates an example of the data structure of the AND operation request 1601 and FIG. 16B illustrates an example of the data structure of the reply 1602. The examples of the data structures illustrated in FIGS. 16A and 16B correspond to the example of the search processing illustrated in FIGS. 12 to 14. A header of the AND operation request 1601 illustrated in FIG. 16A contains a source address and a destination address of the AND operation request 1601. In the example in FIG. 16A, characters C1 and N1 allocated to the computers are illustrated in place of the addresses thereof.

Payload of the AND operation request 1601 illustrated in FIG. 16A has information in a type field, an attribute field, and an identified transposed Bloom filter field. For example, the type field contains "search", the attribute field contains "AND operation request", and the identified transposed Bloom filter field contains the identifiers tbf(3-2) and tbf(3-5) of the identified transposed Bloom filters. The identifiers of the identified transposed Bloom filters may be the index ranges indicating the bit positions of the identified transposed Bloom filters. For example, for the transposed Bloom filter tbf(3-2), the identifier thereof may be the index range of the third to fourth bits.

A header of the reply 1602 illustrated in FIG. 16B contains a source address and a destination address, which are interchanged relative to the source address and the destination address of the AND operation request 1601. Payload of the reply 1602 illustrated in FIG. 16B contains the AND result r3-1 (={10}) of the identified node N1.

Referring back to FIG. 15, when the reply 1602 is not received (No in S1508), the process proceeds to S1509 in which the searching computer determines whether or not a predetermined amount of time has passed from the issuance of the AND operation request 1601. When the predetermined amount of time has not passed (No in S1509), the process returns to S1508. On the other hand, when the predetermined amount of time has passed (Yes in S1509), the searching computer performs error-output processing in S1510. For example, the display 408 may display information indicating that the AND operation request failed.

On the other hand, when the reply 1602 is received (Yes in S1508), the process proceeds to S1511 in which the searching computer executes an AND operation on the AND results included in the replies 1602. For example, the searching computer executes an AND operation on the AND result r3-1 included in the reply 1602 (illustrated in FIG. 16B) transmitted from the node N1 and the AND result r3-3 included in the reply (not illustrated) transmitted from the node N3, to obtain an AND result R3. Thereafter, the process proceeds to S1701 in FIG. 17.

Figure 17:
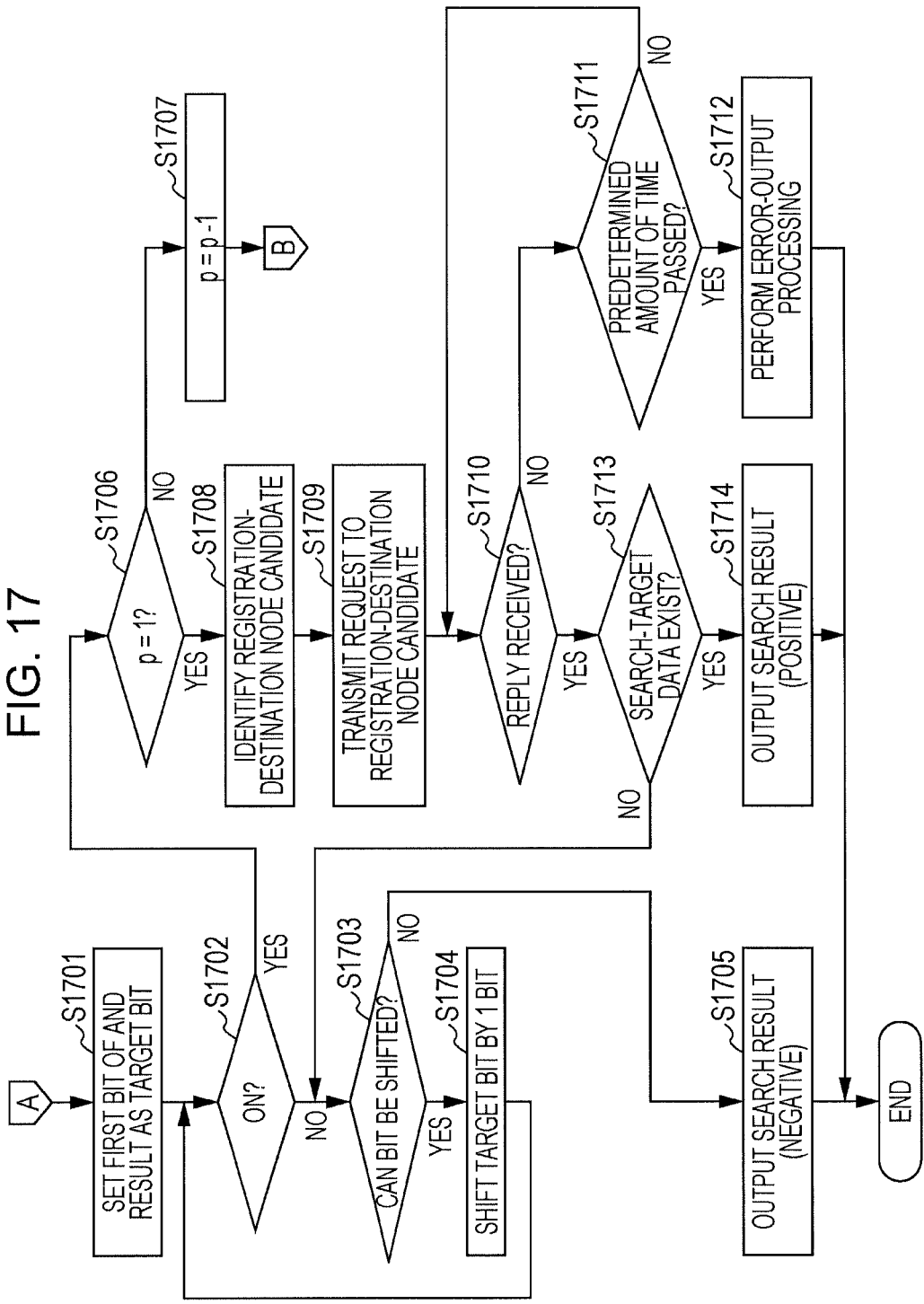
FIG. 17 is a flowchart (a second half) illustrating the example of the procedure of the search processing performed by the searching computer according to the embodiment.

FIG. 17 is a flowchart (a second half) illustrating the example of the procedure of the search processing performed by the searching computer according to the embodiment. In S1701 subsequent to the AND operation in S1511, the searching computer sets a first bit of the AND result as a target bit.

For example, for the AND result R3 (={10}), the searching computer sets the first bit "1" as a target bit.

In S1702, the searching computer determines whether or not the target bit is ON (=1). When the target bit is not ON (=0) (No in S1702), the process proceeds to S1703 in which the searching computer determines whether or not the target bit can be shifted to a subsequent bit. More specifically, the searching computer determines whether or not the target bit is the last bit. Further, for the AND result R3={10}, when the target bit is the first bit "1", the target bit can be shifted, and when the target bit is the last bit "0", the shifting of the target bit is not allowed.

When the target bit can be shifted (Yes in S1703), the process proceeds to S1704 in which the searching computer shifts the target bit toward the end by one bit. Thereafter, the process returns to S1702. On the other hand, when it is determined that the shifting of the target bit is not allowed (No in S1703), the process proceeds to S1705 in which the searching computer determines that the search result is negative and outputs information to that effect. The search result (negative) indicates that the search-target data Dx does not exist in the group of nodes. After S1705, the procedure of the processing when the search result is negative ends.

On the other hand, when the target bit is ON (Yes in S1702), the process proceeds to S1706 in which the searching computer determines whether or not the current stage number "p" is 1 (i.e., p=1). When p is not 1 (No in S1706), the searching computer decrements p by 1 in S1707 and the process returns to S1504 illustrated in FIG. 15. S S1504 to S1511 and S S1701 to S1705 are repeatedly executed until the first stage is reached (however, when the process reaches "END" in FIGS. 15 and 17, the processing ends at that point).

On the other hand, when p is 1 (Yes in S1706), the searching computer identifies a registration-destination node candidate. More specifically, for example, the client C identifies, as a registration-destination node candidate, the node N2 having the data block db4 specified by the bit position "4" where the target bit in the AND result R1 at the first stage was ON in S1702, as illustrated in FIG. 14.

More specifically, by referring to the association table T, the searching computer identifies the node N2 as the registration-destination node candidate, on the basis of the index range (the 25th to 32nd bits) of the transposed Bloom filter tbf(1-4) corresponding to the data block db4. In S1709, the searching computer transmits a hash-table-search request (e.g., a hash-table search request 1801 described below with reference to FIG. 18A) to the registration-destination node candidate in S1709 and waits to receive a reply (e.g., a reply 1802 described below with reference to FIG. 18B) in S1710.

FIGS. 18A and 18B illustrate examples of the data structures of the hash-table search request 1801 and the reply 1802, respectively, and FIGS. 19A and 19B illustrate examples of the data structures of a hash-table search request 1901 and a reply 1902, respectively. The examples of the data structures illustrated in FIGS. 18A, 18B, 19A, and 19B correspond to the example of the search processing illustrated in FIGS. 12 to 14. FIGS. 18A and 18B illustrate a case in which the registration-destination node candidate is the node N2 and FIGS. 19A and 19B illustrate a case in which the registration-destination node candidate is the node N4.

A header of the hash-table search request 1801 illustrated in FIG. 18A contains a source address and a destination address of the hash-table search request 1801 and a hash-table search request 1901 illustrated in FIG. 19A contains a source address and a destination address of the hash-table search request 1901. In the examples in FIGS. 18A, 18B, 19A, and 19B, characters C1, N2, and N4 allocated to the computers are illustrated in place of the addresses thereof.

Payload of each of the hash-table search request 1801 illustrated in FIG. 18A and the hash-table search request 1901 illustrated in FIG. 19A contains information in a type field, an attribute field, and a hash value field. For example, the type field contains "search", the attribute field contains "hash table search", the hash value field contains a hash value "x1" of the hash function H1( ) for the search-target data Dx.

A header of the reply 1802 illustrated in FIG. 18B contains a source address and a destination address, which are interchanged relative to the source address and the destination address of the hash-table search request 1801, and a header of the reply 1902 illustrated in FIG. 19B contains a source address and a destination address, which are interchanged relative to the source address and the destination address of the hash-table search request 1901. Payload of the reply 1802 illustrated in FIG. 18B contains a search result (Dx exists) of the node N2 that is the registration-destination node candidate, i.e., contains information indicating "negative" and payload of the reply 1902 illustrated in FIG. 19B contains a search result (No Dx) of the node N4 that is the registration-destination node candidate.

Referring back to FIG. 17, when a reply (e.g., the reply 1802) is not received (No in S1710), the process proceeds to S1711 in which the searching computer determines whether or not a predetermined amount of time has passed from the issuance of the hash-table search request (e.g., the hash-table search request 1801). When the predetermined amount of time has not passed (No in S1711), the process returns to S1710. On the other hand, when the predetermined amount of time has passed (Yes in S1711), the searching computer performs error-output processing in S1712. For example, the display 408 may display information indicating that the hash-table search failed.

On the other hand, when a reply is received (Yes in S1710), the process proceeds to S1713 in which the searching computer determines whether or not the search-target data Dx exists in the reply. When no search-target data Dx exists (No in S1713), the process proceeds to S1703 in which the searching computer determines whether or not the target bit can be shifted. On the other hand, when the search-target data Dx exists (Yes in S1713), the process proceeds to S1714 in which the searching computer outputs a search result (positive). The searching computer retrieves more relevant data and outputs the retrieved data as a search result, as appropriate. After S1714, the procedure of the processing when the search result is positive ends.

Next, a procedure of search processing performed by the node will be described with reference back to FIG. 11. In FIG. 11, the node waits to receive a request (No in S1101). When a request is received (Yes in S1101), the node identifies the type of request in S1102. More specifically, the node determines whether the type field in the request indicates "registration" or "search".

When the type field indicates "registration" (Registration in S1102), the node determines an attribute in S1109. More specifically, the node determines whether the attribute field in the request indicates "AND operation request" or "hash table search". When the attribute field indicates "AND operation request" (AND Operation Request in S1109), the node determines that the received request is the AND operation request 1601. In this case, in S1110, the node retrieves the transposed Bloom filter identifiers in the transposed Bloom filter field in the AND operation request 1601. For example, in the case of FIG. 16A, the node retrieves the identifiers of the transposed Bloom filters tbf(3-2) and tbf(3-5) from the AND operation request 1601.

On the basis of the retrieved index ranges, the node identifies the transposed Bloom filters belonging thereto. In S1111, the node executes an AND operation. In the example described above, since the transposed Bloom filters tbf(3-2) and tbf(3-5) are identified, the node N1 executes an AND operation on tbf(3-2)={10} and tbf(3-5)={11} to obtain an AND result r3-1={10}.

Subsequently, in S1112, the node transmits, to the searching computer, a reply including the AND result of the AND operation performed in S1111. Thereafter, the search processing performed by the node ends. In the example described above, the node N1 transmits the reply 1602 (illustrated in FIG. 16B) including the AND result r3-1={10}.

When the attribute indicates "hash table search" (Hash Table Search in S1109), the received requests are identified as being the hash-table search requests 1801 and 1901. In this case, in S1113, the node retrieves, from the hash-table search requests 1801 and 1901, the hash values of the hash functions for the search target data.

For example, in the case of FIGS. 18A and 19A, the node retrieves, from the hash-table search requests 1801 and 1901, the hash value "x1" of the hash function H1( ) for the search target data Dx.

In S1114, the node refers to the hash table, held thereby, to search for data associated with the retrieved hash value. In S1115, the node transmits the search result to the searching computer as the replies 1802 and 1902. In the example described above, for example, the node N1 transmits the search result (negative), i.e., the reply 1802 including the search-target data Dx (as illustrated in FIG. 18B). After S1115, the search processing performed by the node ends.

As described above, when the attribute in the request indicates "AND operation request" in S1109 in FIG. 11 and multiple transposed Bloom filters tbf(p) exist, the node executes an AND operation in S1111. However, the node may directly transmit (the bit strings of) the transposed Bloom filters tbf(p) to the searching computer as a reply. With this arrangement, without the node executing the AND operation, it is possible to achieve a reduction in the amount of load of the node.

In the above-described search processing, the use of the group of divided hierarchical transposed Bloom filters, as described above, allows target data to be searched for at high speed and in a large area.

As described above, according to the present embodiment, the Bloom filter array BF(p) is transposed to provide the transposed Bloom filter array tBF(p), which offers advantages in that the number of memory accesses is reduced and the search speed is increased. In particular, since the use of the hierarchical transposed Bloom filter tBF reduces the number of memory accesses for each stage, the search can be performed at higher speed. In addition, since the hierarchical transposed Bloom filter tBF is divided in a bit-width direction and the resulting transposed Bloom filters are allocated to the multiple nodes, the manageable amount of data can be increased. Additionally, the use of the group of divided hierarchical transposed Bloom filters allows target data to be searched for at high speed and in a large area.

By referring to the association table T, the searching computer can also identify the node having the pth-stage transposed Bloom filters and the node having the corresponding data blocks. Accordingly, a computer other than the group of nodes can also perform search on the group of nodes.

Also, when multiple transposed Bloom filters at the pth stage exist, the identified node performs an AND operation and transmits the AND result to the searching computer as a reply. Since the node performs an AND operation on the multiple transposed Bloom filters in the manner described above, the transposed Bloom filters can be compressed into one bit string indicating the AND result. This can reduce the amount of computational load of the searching computer.

In contrast, when multiple transposed Bloom filters at the pth-stage exist, the identified node may transmit the individual bit strings of the transposed Bloom filters to the searching computer as a reply without performing the AND operation. In such a case, the amount of computational load of the node can be reduced.

The CPU 401 may execute a search program stored in the storage device, such as the ROM 402, the RAM 403, the magnetic disk 405, or the optical disk 407 illustrated in FIG. 4, to execute the processing in the S described above and illustrated in the flowcharts. Each time the search program is executed, the result of the execution may be written to the storage device. The result of the execution may also be read for other processing, as appropriate.

The search method described in the above embodiment can be realized by causing a computer, such as a personal computer or a workstation, to execute the search program. The search program may be recorded to a computer-readable recording medium, such as a hard disk, a flexible disk, a CD-ROM (compact disc-read only memory), an MO (magneto optical) disk, a DVD (digital versatile disc), or the like, and the computer may read the search program therefrom to execute the search program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer readable storage medium storing a search program for a computer that is capable of accessing a group of nodes having divided-data structures obtained by dividing a data structure having a transposed hierarchical bloom filter of a hierarchical bloom filter and a set of data blocks by a predetermined bit width, wherein the hierarchical bloom filter has h-stage bloom filter arrays each having a bit width of "s", the hth-stage bloom filter array having bits indicating false positives or negatives and the pth-stage bloom filter array having $n=d^{[h-(p-1)]}$ bloom filters (where $1 \leq p \leq h$) each having a bit width of $m=s/d^{[h-(p-1)]}$ (where d indicates a division number for the hth-stage bloom filter array), the transposed hierarchical bloom filter is obtained by grouping bits at the same positions in the bloom filters in the bloom filter array for each stage, and the set of data blocks corresponds to the first-stage bloom filter array of the hierarchical bloom filter, the search program causing the computer to execute a processing, the processing comprising:

converting search-target data into pieces of position information indicating in-array positions of the transposed bloom filters, based on respective types of hash functions;

identifying, in the pth-stage transposed bloom filter array, the pth-stage transposed bloom filters corresponding to the respective pieces of position information;

obtaining the identified pth-stage transposed bloom filters from the nodes having the identified pth-stage transposed bloom filters;

determining whether or not the bit positions of the bits indicating false positives are the same in the obtained pth-stage transposed bloom filters;

determining whether or not the pth stage is the first stage, when it is determined that the bit positions of the bits indicating the false positives are the same; and obtaining, when it is determined that the pth stage is the first stage, a search result from at least one of the nodes having the data blocks corresponding to the bit positions of the bits indicating the false positives, the search result indicating whether or not the search-target data exists in the data block corresponding to the bit positions of the bits indicating the false positives.

2. The non-transitory, computer readable storage medium according to claim 1, wherein the processing further comprises identifying the nodes having the identified pth-stage transposed bloom filters by referring to an association table in which bit ranges of the divided data structures according to the predetermined bit width and the nodes of the group of nodes are associated with each other.

3. The non-transitory, computer readable storage medium according to claim 2, wherein, in the processing of obtaining the identified pth-stage transposed bloom filters, the identified pth-stage transposed bloom filters are obtained from the identified nodes.

4. The non-transitory, computer readable storage medium according to claim 3, wherein, in the processing of obtaining the identified pth-stage transposed bloom filters, a result of logical conjunction on the pth-stage transposed bloom filters is obtained from the identified node having at least two of the identified pth-stage transposed bloom filters; and in the processing of determining whether or not the bit positions of the bits indicating the false positives at the same, whether or not the bit positions of the bits indicating the false positives are the same in the pth-stage transposed bloom filters is determined based on the obtained result of the logical conjunction.

5. The non-transitory, computer readable storage medium according to claim 4, wherein, when it is determined that the pth stage is the first stage, the computer is caused to execute processing of identifying the nodes having the data blocks corresponding to the bit positions of the bits indicating the false positives, by referring to the association table.

6. The non-transitory, computer readable storage medium according to claims 5, wherein, when it is determined that the pth stage is not the first stage, the computer is caused to execute the processing, regarding the next stage below the pth stage as a new pth stage.

7. A search method for a computer that is capable of accessing a group of nodes having divided-data structures obtained by dividing a data structure having a transposed hierarchical bloom filter of a hierarchical bloom filter and a set of data blocks by a predetermined bit width, wherein the hierarchical bloom filter has h-stage bloom filter arrays each having a bit width of "s", the hth-stage bloom filter array having bits indicating false positives or negatives and the pth-stage bloom filter array having $n=d^{[h-(p-1)]}$ bloom filters (where $1 \leq p \leq h$) each having a bit width of $m=s/d^{[h-(p-1)]}$ (where d indicates a division number for the hth-stage bloom filter array), the transposed hierarchical bloom filter is obtained by grouping bits at the same positions in the bloom filters in the bloom filter array for each stage, and the set of data blocks corresponds to the first-stage bloom filter array of the hierarchical bloom filter, the computer executing processing comprising:

converting search-target data into pieces of position information indicating in-array positions of the transposed bloom filters, based on respective types of hash functions;

identifying, in the pth-stage transposed bloom filter array, the pth-stage transposed bloom filters corresponding to the respective pieces of position information;

obtaining the identified pth-stage transposed bloom filters from the nodes having the identified pth-stage transposed bloom filters;

determining whether or not the bit positions of the bits indicating false positives are the same in the obtained pth-stage transposed bloom filters;

determining whether or not the pth stage is the first stage, when it is determined that the bit positions of the bits indicating the false positives are the same; and obtaining, when it is determined that the pth stage is the first stage, a search result from at least one of the nodes having the data blocks corresponding to the bit positions of the bits indicating the false positives, the search result indicating whether or not the search-target data exists in the data block corresponding to the bit positions of the bits indicating the false positives.

8. A search apparatus that is capable of accessing a group of nodes having divided-data structures obtained by dividing a data structure having a transposed hierarchical bloom filter of a hierarchical bloom filter and a set of data blocks by a predetermined bit width, wherein the hierarchical bloom filter has h-stage bloom filter arrays each having a bit width of "s", the hth-stage bloom filter array having bits indicating false positives or negatives and the pth-stage bloom filter array having $n=d^{[h-(p-1)]}$ bloom filters (where $1 \leq p \leq h$) each having a bit width of $m=s/d^{[h-(p-1)]}$ (where d indicates a division number for the hth-stage bloom filter array), the transposed hierarchical bloom filter is obtained by grouping bits at the same positions in the bloom filters in the bloom filter array for each stage, and the set of data blocks corresponds to the first-stage bloom filter array of the hierarchical bloom filter, the search apparatus comprising:

a processor that converts search-target data into pieces of position information indicating in-array positions of the transposed bloom filters, based on respective types of hash functions;

identifies, in the pth-stage transposed bloom filter array, the pth-stage transposed bloom filters corresponding to the respective pieces of position information;

obtains the identified pth-stage transposed bloom filters from the nodes having the identified pth-stage transposed bloom filters;

determines whether or not the bit positions of the bits indicating false positives are the same in the obtained pth-stage transposed bloom filters;

determines whether or not the pth stage is the first stage, when it is determined that the bit positions of the bits indicating the false positives are the same; and obtains, when it is determined that the pth stage is the first stage, a search result from at least one of the nodes having the data blocks corresponding to the bit positions of the bits indicating the false positives, the search result indicating whether or not the search-target data exists in the data block corresponding to the bit positions of the bits indicating the false positives.

* * * * *

UNITED STATES PATENT AND TRADEMARK OFFICE
CERTIFICATE OF CORRECTION

| | |
|---|---|
| PATENT NO. | : 8,423,562 B2 |
| APPLICATION NO. | : 13/461176 |
| DATED | : April 16, 2013 |
| INVENTOR(S) | : Takashi Watanabe et al. |

It is certified that error appears in the above-identified patent and that said Letters Patent is hereby corrected as shown below:

In the Claims

Column 24, Line 51, In Claim 6, delete "claims 5," and insert --claim 5,--, therefor.

Signed and Sealed this
Sixteenth Day of July, 2013

Teresa Stanek Rea
*Acting Director of the United States Patent and Trademark Office*